(12) United States Patent
Oto

(10) Patent No.: US 8,934,710 B2
(45) Date of Patent: Jan. 13, 2015

(54) IMAGE PROCESSING APPARATUS, IMAGE PROCESSING METHOD, AND COMPUTER-READABLE MEDIUM

(75) Inventor: Hiroshi Oto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/450,348

(22) Filed: Apr. 18, 2012

(65) Prior Publication Data

US 2012/0288188 A1    Nov. 15, 2012

(30) Foreign Application Priority Data

May 9, 2011    (JP) ................................. 2011-104743

(51) Int. Cl.
G06K 9/34     (2006.01)
G06T 9/20     (2006.01)
H04N 19/186   (2014.01)
H04N 19/14    (2014.01)

(52) U.S. Cl.
CPC ............ *G06T 9/20* (2013.01); *H04N 19/00315* (2013.01); *H04N 19/00157* (2013.01)
USPC ......................................................... 382/164

(58) Field of Classification Search
None
See application file for complete search history.

(56) References Cited

U.S. PATENT DOCUMENTS

| | | | | |
|---|---|---|---|---|
| 5,872,864 A | * | 2/1999 | Imade et al. .................. | 382/176 |
| 6,128,407 A | * | 10/2000 | Inoue et al. ................... | 382/167 |
| 6,404,921 B1 | * | 6/2002 | Ishida ........................... | 382/197 |
| 6,784,896 B1 | * | 8/2004 | Perani et al. .................. | 345/589 |
| 7,038,697 B2 | * | 5/2006 | Gangnet et al. ............... | 345/606 |
| 7,304,648 B2 | * | 12/2007 | Beaumont et al. ............ | 345/589 |
| 7,366,635 B1 | * | 4/2008 | Gupta et al. .................. | 702/150 |
| 7,427,994 B2 | * | 9/2008 | Gangnet et al. ............... | 345/606 |
| 7,623,712 B2 | * | 11/2009 | Dai et al. ....................... | 382/180 |
| 7,689,060 B2 | * | 3/2010 | Messina et al. ............... | 382/276 |

(Continued)

FOREIGN PATENT DOCUMENTS

| | | |
|---|---|---|
| JP | 2006-344069 | 12/2006 |
| JP | 2007-158725 | 6/2007 |

(Continued)

OTHER PUBLICATIONS

Orzan et al. "Structure-preserving manipulation of photographs" 2007.*

(Continued)

*Primary Examiner* — Vu Le
*Assistant Examiner* — Alexander J Lesnick
(74) *Attorney, Agent, or Firm* — Fitzpatrick, Cella, Harper & Scinto

(57) ABSTRACT

An image processing apparatus comprises: a unit configured to generate a gradation cluster by determining color regions belonging to the same gradation among a plurality of color regions using gradation attribute of boundary, and to generate gradation cluster information including information about a color region belonging to the generated gradation cluster and a gradation type of the gradation cluster; a unit configured to generate a gradation parameter for each gradation region using the color region, the color gradient information, and the gradation cluster information; a unit configured to integrate color regions belonging to the same gradation using the gradation cluster information; and a unit configured to generate a contour vector description based on a color region after integration, and to generate vector data of the gradation region based on the contour vector description and the gradation parameter.

9 Claims, 21 Drawing Sheets

(56) References Cited

U.S. PATENT DOCUMENTS

| | | | |
|---|---|---|---|
| 7,903,307 B2 * | 3/2011 | Dai et al. | 358/540 |
| 7,936,929 B2 * | 5/2011 | Dai et al. | 382/225 |
| 8,023,147 B2 | 9/2011 | Dai et al. | 358/1.18 |
| 8,055,065 B2 * | 11/2011 | Allen | 382/162 |
| 8,125,679 B2 | 2/2012 | Dai et al. | 358/1.18 |
| 8,229,214 B2 * | 7/2012 | Fukuoka et al. | 382/164 |
| 8,290,256 B2 * | 10/2012 | Kitago | 382/164 |
| 8,300,939 B2 * | 10/2012 | Naito | 382/177 |
| 8,369,621 B2 * | 2/2013 | Nomura | 382/190 |
| 8,369,637 B2 * | 2/2013 | Ishida | 382/243 |
| 8,395,813 B2 * | 3/2013 | Yago | 358/1.9 |
| 8,411,990 B1 * | 4/2013 | Hadap et al. | 382/274 |
| 8,422,774 B2 * | 4/2013 | Tsunematsu | 382/266 |
| 8,442,314 B2 * | 5/2013 | Kitago | 382/167 |
| 2004/0227767 A1 * | 11/2004 | Baroncelli et al. | 345/589 |
| 2005/0180635 A1 * | 8/2005 | Trifonov et al. | 382/199 |
| 2007/0086667 A1 * | 4/2007 | Dai et al. | 382/242 |
| 2007/0147700 A1 * | 6/2007 | Jeong et al. | 382/266 |
| 2009/0040246 A1 * | 2/2009 | Miyasaka | 345/698 |
| 2009/0324065 A1 * | 12/2009 | Ishida et al. | 382/164 |
| 2010/0054587 A1 * | 3/2010 | Fukuoka et al. | 382/164 |
| 2010/0097656 A1 * | 4/2010 | Misawa et al. | 358/2.1 |
| 2010/0124361 A1 * | 5/2010 | Gaddy | 382/107 |
| 2010/0158360 A1 * | 6/2010 | Dai | 382/164 |
| 2010/0174977 A1 * | 7/2010 | Mansfield et al. | 715/234 |
| 2010/0183225 A1 * | 7/2010 | Vantaram et al. | 382/173 |
| 2010/0225984 A1 * | 9/2010 | Niina et al. | 358/538 |
| 2010/0232717 A1 * | 9/2010 | Matsuguma et al. | 382/224 |
| 2010/0259541 A1 * | 10/2010 | Kitago | 345/423 |
| 2011/0019927 A1 * | 1/2011 | Nagamatsu | 382/225 |
| 2011/0069881 A1 * | 3/2011 | Kitago | 382/164 |
| 2012/0011142 A1 * | 1/2012 | Baheti et al. | 707/769 |
| 2012/0093401 A1 * | 4/2012 | Tsunematsu | 382/165 |
| 2012/0113098 A1 * | 5/2012 | Hu et al. | 345/419 |
| 2012/0114230 A1 * | 5/2012 | Dai et al. | 382/164 |
| 2012/0287488 A1 * | 11/2012 | Oto | 358/505 |

FOREIGN PATENT DOCUMENTS

| | | |
|---|---|---|
| JP | 2007-272456 | 10/2007 |
| JP | 2009-508239 | 2/2009 |
| JP | 2010-146218 | 7/2010 |
| WO | 2007/033429 | 3/2007 |

OTHER PUBLICATIONS

Orzan et al. "Diffusion Curves: A Vector Representation for Smooth-Shaded Images" 2008.*

Sun et al. "Image Vectorization using Optimized Gradient Meshes" 2007.*

Orzan et al. Diffusion Curves: A Vector Representation for Smooth-Shaded Images, published 2008.*

U.S. Appl. No. 13/453,843, filed Apr. 23, 2012 by Hiroshi Oto.

* cited by examiner

FIG. 3

| BOUNDARY | LABEL A | LABEL B | BOUNDARY LENGTH | UPPER COLOR GRADIENT | LOWER COLOR GRADIENT | RIGHT COLOR GRADIENT | LEFT COLOR GRADIENT | AVERAGE COLOR GRADIENT |
|---|---|---|---|---|---|---|---|---|
| ... | ... | ... | ... | ... | ... | ... | ... | ... |
| n | 1 | 3 | 6 | 1200 | 0 | 0 | 0 | 200 |
| ... | ... | ... | ... | ... | ... | ... | ... | ... |

FIG. 10
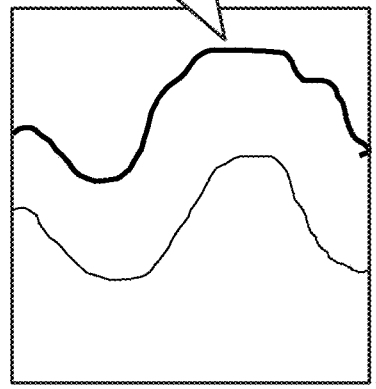
COLOR REGION IDENTIFICATION RESULT
| BOUNDARY n | |
|---|---|
| UPPER COLOR GRADIENT | LARGE |
| LOWER COLOR GRADIENT | LARGE |
| LEFT COLOR GRADIENT | SMALL |
| RIGHT COLOR GRADIENT | LARGE |
| ... | |
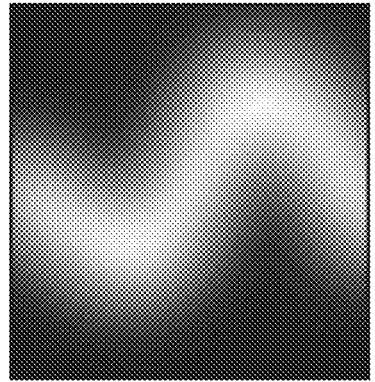
INPUT IMAGE

F I G. 13

| BOUNDARY | LABEL A | LABEL B | BOUNDARY LENGTH | UPPER COLOR GRADIENT | LOWER COLOR GRADIENT | RIGHT COLOR GRADIENT | LEFT COLOR GRADIENT | AVERAGE COLOR GRADIENT | BOUNDARY ATTRIBUTE |
|---|---|---|---|---|---|---|---|---|---|
| 1 | 1 | 2 | 300 | 23000 | 22000 | 21000 | 24000 | 300 | EDGE |
| 2 | 2 | 3 | 200 | 1200 | 900 | 1100 | 800 | 20 | RADIAL GRADATION |
| 3 | 3 | 4 | 100 | 400 | 350 | 350 | 400 | 15 | RADIAL GRADATION |
| 4 | 1 | 5 | 80 | 10000 | 10000 | 0 | 4000 | 300 | EDGE |
| 5 | 1 | 6 | 120 | 8000 | 8000 | 0 | 8000 | 200 | EDGE |
| 6 | 1 | 7 | 120 | 6000 | 6000 | 6000 | 0 | 150 | EDGE |
| 7 | 1 | 8 | 80 | 3000 | 2500 | 2500 | 0 | 100 | EDGE |
| 8 | 5 | 6 | 40 | 0 | 0 | 800 | 0 | 20 | LINEAR GRADATION |
| 9 | 6 | 7 | 80 | 0 | 0 | 1200 | 0 | 15 | LINEAR GRADATION |
| 10 | 7 | 8 | 40 | 0 | 0 | 720 | 0 | 18 | LINEAR GRADATION |

FIG. 14

| GRADATION CLUSTER | LABEL | BOUNDARY | TYPE | GRADIENT ANGLE |
|---|---|---|---|---|
| 1 | 2, 3, 4 | 2, 3 | RADIAL | INITIAL VALUE |
| 2 | 5, 6, 7, 8 | 8, 9, 10 | LINEAR | 0 |

| START POINT | END POINT | OFFSET 1 | | OFFSET 2 | | OFFSET 3 | | OFFSET 4 | |
|---|---|---|---|---|---|---|---|---|---|
| | | OFFSET VALUE | COLOR | OFFSET VALUE | COLOR | OFFSET VALUE | COLOR | OFFSET VALUE | COLOR |
| (100, 100) | (300, 100) | 20 | (20, 20, 20) | 40 | (40, 40, 40) | 60 | (60, 60, 60) | 80 | (80, 80, 80) |

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus, image processing method, and computer-readable medium. Particularly, the present invention relates to an image processing technique of extracting a gradation portion from a raster image and converting it into a vector image.

2. Description of the Related Art

Recently, an opportunity to use one image information in different devices is growing. This boosts demands for higher compression ratios to reduce transmission cost between devices and higher image qualities to cope with a resolution difference between devices. User friendliness requires editability so that an image can be partially edited again. Under the circumstance, a vectorization technique is needed to convert an image expressed in the raster format into a vector format capable of easy re-editing regardless of the resolution.

However, when all colors in an image expressed in the raster format are reproduced by vectors, noise and the like are also reproduced, spoiling high image quality, high compression ratio, and re-editability which are advantages of the vector format. To prevent this, the vectorization technique requires subtractive color processing to reduce the number of colors in a raster image to a certain degree.

Japanese Patent Laid-Open No. 2006-344069 discloses a subtractive color processing method in the image vectorization technique. In this method, an image is input, and the number of colors of the input image is reduced using color similarity. The contour line of each color region is extracted and approximated by a function, and vector data is output in addition to color information. However, when a gradation region is processed, the color similarity-based subtractive color processing generates a contour between color regions which does not exist in an original image, that is, a pseudo contour, degrading the image quality.

To prevent this, Japanese Patent Laid-Open No. 2007-272456 discloses a method of determining the gradation attribute of a color region obtained by subtractive color processing, and performing vectorization corresponding to the attribute. In this method, a region determined to be identical to a given region in the above-mentioned subtractive color processing is analyzed in more detail. That is, the color change direction between pixels in each color region is detected, and the gradation attribute is determined using the result. Japanese Patent Laid-Open No. 2009-508239 discloses a method of determining a gradation region from an image and performing vectorization. In this method, the color gradient between pixels in an image is calculated, a gradation region is determined using the result, and a path having pixels of almost the same color is generated for the obtained gradation region. A perpendicular to the path is defined, a representative color value is calculated on the perpendicular, and vectorization is executed. However, this method requires arithmetic processing to calculate a color gradient in the entire image region, decreasing the speed.

Hence, a technique of quickly identifying a gradation region in an image and generating gradation parameters corresponding to the feature of the gradation region has not been proposed.

The present invention has been made to solve the above problems, and performs gradation vectorization processing quickly.

SUMMARY OF THE INVENTION

According to one aspect of the present invention, there is provided an image processing apparatus comprising: a division unit configured to divide an input image into a plurality of color regions based on a color difference; a color gradient information calculation unit configured to calculate color gradient information at a boundary between the divided color regions from color information of the input image; an attribute determination unit configured to determine a gradation attribute representing a characteristic of a color gradient at the boundary using the color gradient information; a gradation cluster information generation unit configured to generate a gradation cluster by determining color regions belonging to the same gradation among the plurality of color regions using the gradation attribute of the boundary, and to generate gradation cluster information including information about a color region belonging to the generated gradation cluster and a gradation type of the gradation cluster; a gradation parameter generation unit configured to generate a gradation parameter for each gradation region using the color region, the color gradient information, and the gradation cluster information; a color region integration unit configured to integrate color regions belonging to the same gradation using the gradation cluster information; and a contour vector description generation unit configured to generate a contour vector description based on a color region after integration by the color region integration unit, and to generate vector data of the gradation region based on the contour vector description and the gradation parameter.

According to another aspect of the present invention, there is provided an image processing method comprising: a division step of dividing an input image into a plurality of color regions based on a color difference; a color gradient information calculation step of calculating color gradient information at a boundary between the divided color regions from color information of the input image; an attribute determination step of determining a gradation attribute representing a characteristic of a color gradient at the boundary using the color gradient information; a gradation cluster information generation step of generating a gradation cluster by determining color regions belonging to the same gradation among the plurality of color regions using the gradation attribute of the boundary, and generating gradation cluster information including information about a color region belonging to the generated gradation cluster and a gradation type of the gradation cluster; a gradation parameter generation step of generating a gradation parameter for each gradation region using the color region, the color gradient information, and the gradation cluster information; a color region integration step of integrating color regions belonging to the same gradation using the gradation cluster information; and a contour vector description generation step of generating a contour vector description based on a color region after integration in the color region integration step, and generating vector data of the gradation region based on the contour vector description and the gradation parameter.

The present invention can quickly perform vectorization of a gradation region in accordance with the feature of the gradation of an input image.

Further features of the present invention will become apparent from the following description of exemplary embodiments (with reference to the attached drawings).

BRIEF DESCRIPTION OF THE DRAWINGS

FIG. 3 is a table exemplifying boundary color gradient information according to the first embodiment;

FIG. 10 is a view showing an input example of a complex gradation and the color region identification result according to the first embodiment;

FIG. 13 is a table showing boundary color gradient information and a boundary attribute in FIG. 12 according to the first embodiment;

FIG. 14 is a table showing gradation cluster information in FIG. 12 according to the first embodiment;

DESCRIPTION OF THE EMBODIMENTS

First Embodiment

Embodiments of the present invention will now be described with reference to the accompanying drawings. Building components set forth in these embodiments are merely examples. The technical scope of the present invention should be determined by the appended claims and is not limited to the individual embodiments to be described below.

[Apparatus Arrangement]

Figure 2:
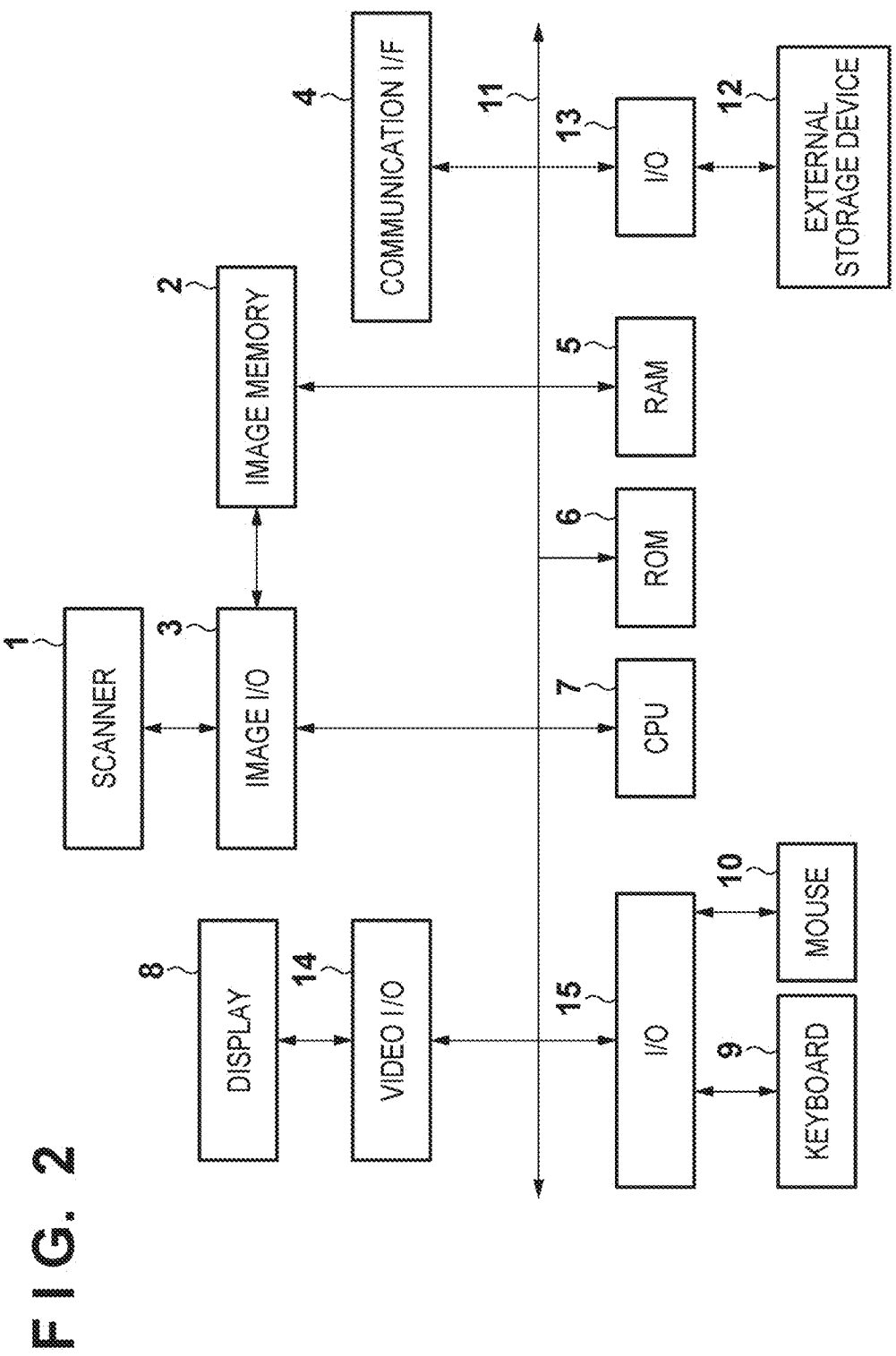
FIG. 2 is a block diagram showing the arrangement of the image processing apparatus.

The arrangement of an image processing apparatus according to the embodiment will be explained with reference to the block diagram of FIG. 2. Referring to FIG. 2, a CPU (Central Processing Unit) 7 controls the overall apparatus. A ROM (Read Only Memory) 6 stores programs and parameters which need not be changed. A RAM (Random Access Memory) 5 temporarily stores programs and data which are supplied from an external apparatus and the like. A scanner 1 photoelectrically scans a document and the like to obtain electronic image data as input data. An image input/output (I/O) 3 connects the scanner 1 and the image processing apparatus. An image memory 2 holds image data and the like read by the scanner 1. An external storage device 12 includes a hard disk and memory card which are fixedly installed, or a detachable optical disk, magnetic card, optical card, IC card, and memory card such as a flexible disk (FD) and CD (Compact Disk). An I/O 13 is an input/output interface between the external storage device 12 and a computer apparatus. An I/O 15 is an input/output interface with an input device including a pointing device 10 (for example, mouse) and a keyboard 9 which receive user operations and input data. A video I/O 14 is an input/output interface with a display monitor 8 for displaying data held in the image processing apparatus and supplied data. A communication I/F 4 is an interface for connecting to a network line such as the Internet. A system bus 11 connects the respective units in the image processing apparatus communicably.

[Processing Sequence]

A processing sequence to implement the present invention by a program running on the CPU 7 will be explained with reference to the flowchart of FIG. 1.

Figure 1:
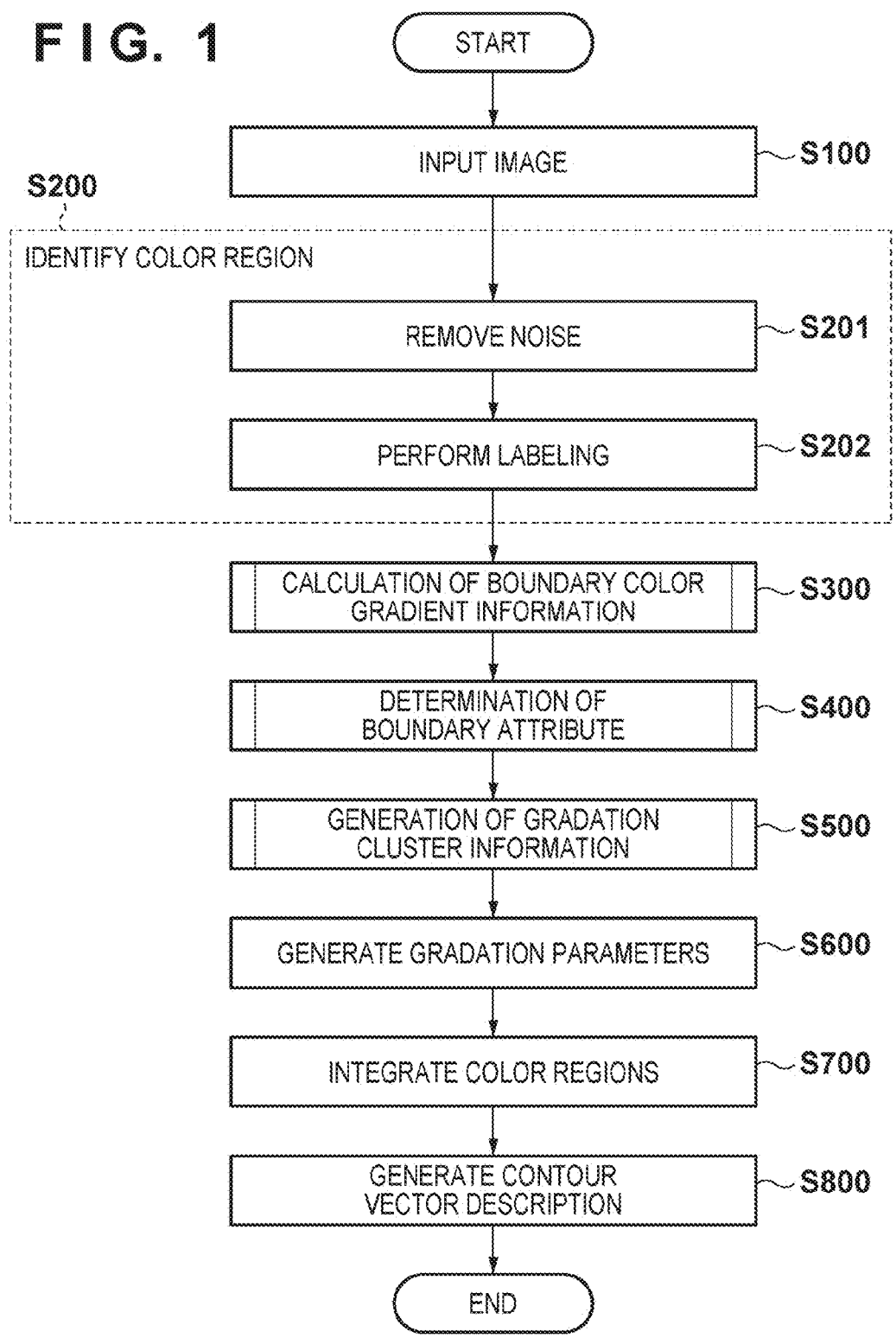
FIG. 1 is a flowchart showing main processing by an image processing apparatus.

In the flowchart of FIG. 1, the process starts in step S100, and image data containing an image region to be processed is input. As for the image input, image data read by the scanner 1 in FIG. 2 is input to the image memory 2 via the image I/O 3. An image containing an image region to be processed may be input outside from the apparatus via the communication I/F 4. Alternatively, image data stored in advance in the external storage device 12 may be read via the I/O 13. The obtained input image is held in the image memory 2.

[Color Region Identification Processing]

Color region identification processing in step S200 is performed for the read image data. When an input unit such as a scanner is used, noise may be superposed on an input image and make it difficult to specify a representative color. In this case, by performing subtractive color processing, the input image can be divided into a plurality of color regions as regions of the same color so that pixels with a small color difference have the same color information at once. In step S201, the above problem can be solved by executing subtractive color processing for the input image in step S201. For example, the method disclosed in Japanese Patent Laid-Open No. 2006-344069 removes scan noise by forming clusters from pixels in an input image based on color information and integrating similar clusters or clusters considered to be noise. By applying this method, noise generated in a scanned image input or the like can be removed. Note that another method is usable as the noise removal method.

In step S202, a color region is extracted by labeling processing. In labeling processing, the same number (identification information) is assigned to a set of pixels to be connected with the same value. Labeling processing is often used as pre-processing for acquiring information (area and shape) of each color region. In this case, an identification number, that is, a label is assigned so that a color region can be identified in subsequent processing. Color region identification processing (step S200) in FIG. 1 are implemented by steps S201 and S202.

[Boundary Color Gradient Information Calculation Processing]

In step S300, boundary color gradient information calculation processing is performed based on the color region identification result in step S200. In this case, boundary information and color gradient information are obtained for each color region boundary, as shown in FIG. 3. In the following description, information shown in FIG. 3 will be referred to as "boundary color gradient information". As shown in FIG. 3, the boundary color gradient information includes information about the boundary number, label A and label B which sandwich a boundary (that is, information about two color regions which sandwich the boundary), boundary length, upper, lower, right, and left direction color gradient intensities, and an average color gradient.

Figure 4:
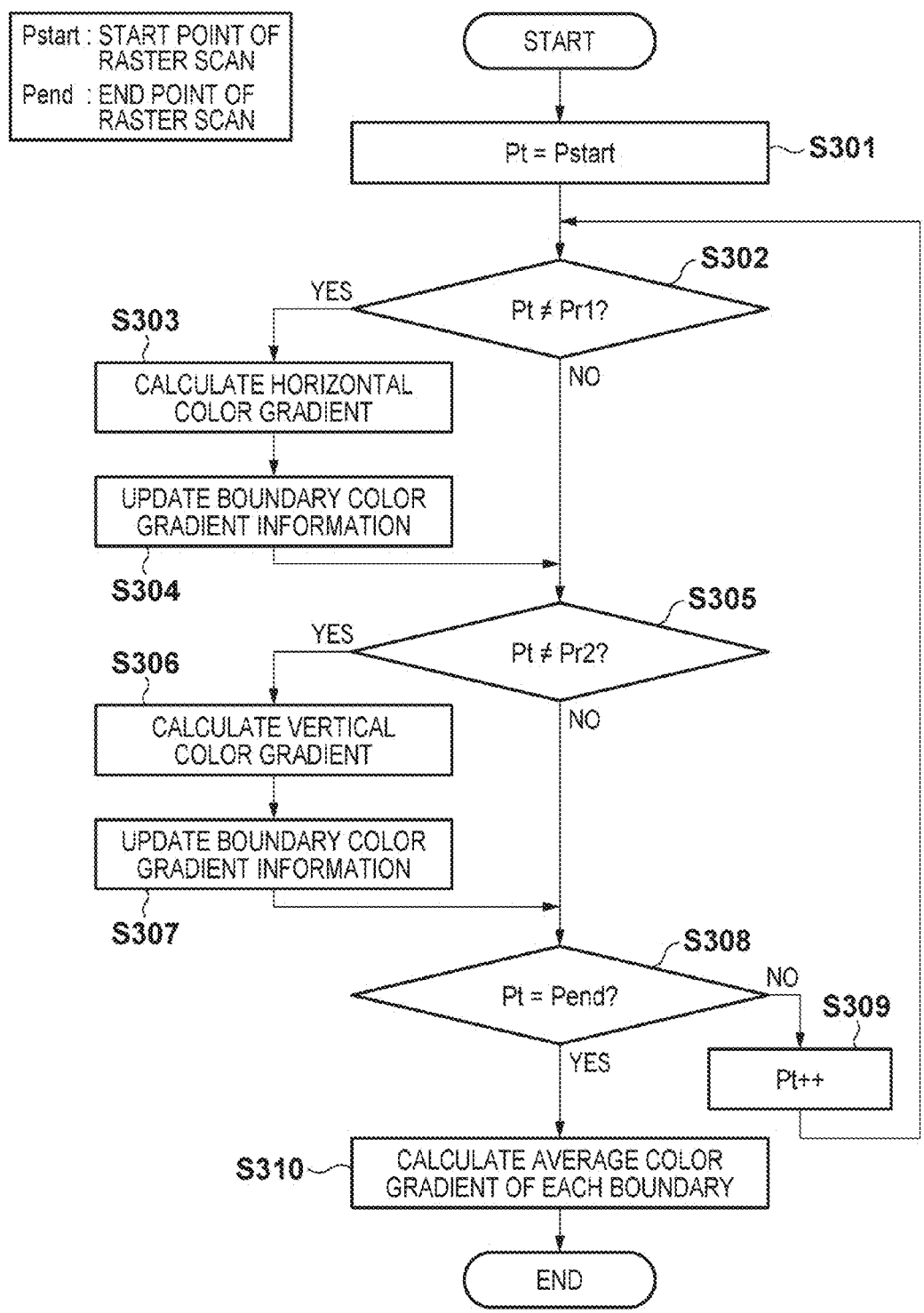
FIG. 4 is a flowchart showing a boundary color gradient information calculation sequence according to the first embodiment.
Figure 5:
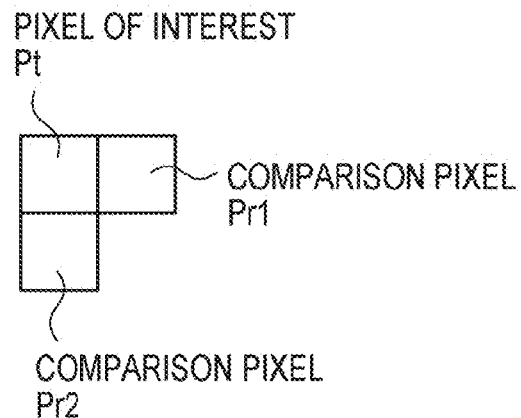
FIG. 5 is a view showing a pixel of interest and comparison pixels when performing raster scan according to the first embodiment.

A detailed sequence in step S300 will be described with reference to FIG. 4. Note that terms in a description of raster scan will be defined. As shown in FIG. 5, Pt is the pixel of interest, Pr1 is a horizontal comparison pixel, and Pr2 is a vertical comparison pixel.

In step S301, the CPU 7 sets Pt at the start point Pstart of raster scan. Here, Pstart is set at an upper left pixel among pixels contained in an input image. In step S302, the CPU 7 determines whether Pt and Pr1 have the same label. If Pt and Pr1 do not have the same label (YES in step S302), the process shifts to step S303; if they have the same label (NO in step S302), to step S305.

In step S303, the CPU 7 calculates a horizontal color gradient using a window function. At this time, a color value for calculating a color gradient is acquired from a held input image. Values dr, dg, and db are calculated for the respective R, G, and B values using a window function in 6a of FIG. 6. A value having a maximum absolute value among the calculated values is set as a color gradient dc. For example, (R, G, B) at respective pixel positions in 6a of FIG. 6 have the following values:

Pc1: (30, 20, 10)
Pt: (40, 15, 8)
Pc2: (80, 10, 6)
Pc3: (90, 5, 4)

Figure 6:
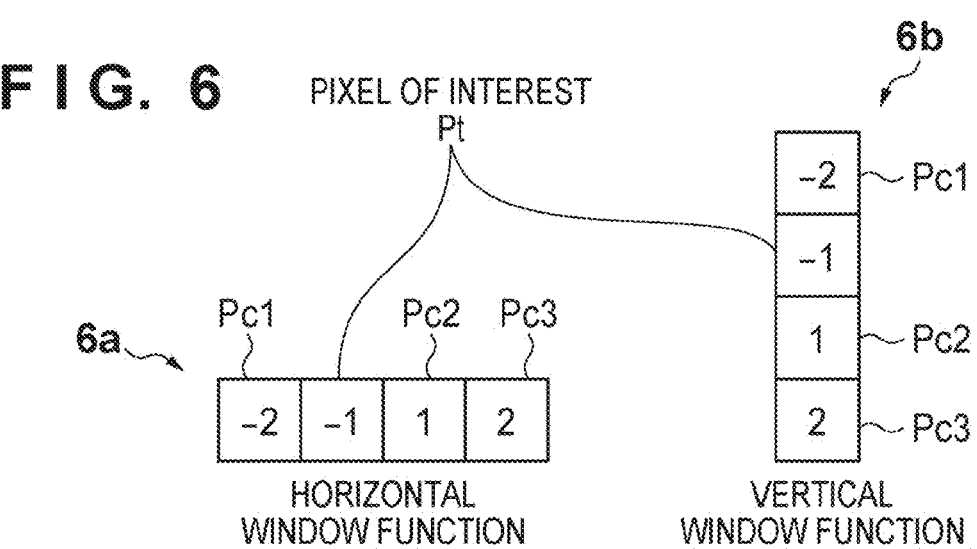
FIG. 6 is a view showing a window function for calculating a color gradient according to the first embodiment.

The window function in 6a of FIG. 6 gives the following values dr, dg, and db:

$$dr = (-2 \times 30) + (-1 \times 40) + (1 \times 80) + (2 \times 90)$$
$$= 160$$
$$dg = (-2 \times 20) + (-1 \times 15) + (1 \times 10) + (2 \times 5)$$
$$= -35$$
$$db = (-2 \times 10) + (-1 \times 8) + (1 \times 6) + (2 \times 4)$$
$$= -14$$

In this case, dr has a maximum absolute value, so the color gradient dc is "160". A positive color gradient dc is defined as a left color gradient, and a negative color gradient dc is defined as a right color gradient. The definition may be reversed, as a matter of course. Note that the color value used in color gradient calculation may be one in an arbitrary color space such as the RGB color space or YCC color space. The number of color components used to calculate a color gradient may be limited to one, as exemplified above, or all components may be used for calculation. Another window function or another calculation equation is also available. After the end of this processing, the process shifts to step S304.

In step S304, the CPU 7 updates the boundary color gradient information. First, the CPU 7 compares a combination of two labels which define a currently referred boundary with a combination of labels registered for each boundary in existing boundary color gradient information (FIG. 3), and determines whether the combination has been registered. If the combination has been registered, the CPU 7 increments the boundary length of corresponding boundary color gradient information by one. At this time, the color gradient dc obtained in the preceding step is added to an item corresponding to the direction. In the above-described example, the color gradient dc is 160, the sign is positive, and thus the color gradient dc is added to the left color gradient item. If the combination has not been registered, the CPU 7 generates new boundary color gradient information. More specifically, the CPU 7 writes, in the items of label A and label B in boundary color gradient information, two labels which define a currently referred boundary. Then, the CPU 7 sets 1 in the boundary length and the color gradient dc in an item corresponding to the direction, and initializes all the remaining values to 0. After the end of this processing, the process shifts to step S305.

In step S305, the CPU 7 determines whether Pt and Pr2 have the same label. If Pt and Pr2 do not have the same label (YES in step S305), the process shifts to step S306; if they have the same label (NO in step S305), to step S308.

In step S306, the CPU 7 calculates a vertical color gradient using a window function. For example, the vertical color gradient is calculated using a window function as shown in 6b of FIG. 6. At this time, a color value for calculating a color gradient is obtained from a held input image, similar to step S303. The color gradient is calculated using a vertical window function according to the same sequence as step S303. A positive color gradient dc is defined as an upper color gradient, and a negative color gradient dc is defined as a lower color gradient. The definition may be reversed, as a matter of course. After the end of this processing, the process shifts to step S307.

In step S307, the CPU 7 updates the boundary color gradient information. The update sequence is the same as step S304. After the end of this processing, the process shifts to step S308.

In step S308, the CPU 7 determines whether Pt has reached the end point Pend of raster scan. Here, a lower right pixel among pixels contained in an input image is defined as Pend. If Pt has reached the position of Pend (YES in step S308), the process shifts to step S310; if it has not reached the position of Pend (NO in step S308), to step S309.

In step S309, the CPU 7 shifts Pt by one to change the pixel of interest, and the process returns to step S302.

In step S310, the CPU 7 calculates an average color gradient using the obtained boundary color gradient information. More specifically, the CPU 7 adds the values of all the upper, lower, right, and left color gradients, divides the sum by the boundary length, and substitutes the result into the average color gradient item in the boundary color gradient information. For a boundary n shown in FIG. 3, the average color gradient is (1200+0+0+0)/6=200. As a result, values shown in FIG. 3 can be extracted by the number of boundaries. Steps S301 to S310 implement boundary color gradient information calculation processing (step S300) in FIG. 1.

When no Pr1 is obtained because Pt has reached the right end of an image or when no Pr2 is obtained because Pt has reached the bottom of an image, the process shifts to next processing without performing comparison, which has not been described for simplicity. Also, when pixel values sufficient for the window function are not obtained because Pt has reached an image end, the shape of the window function may be changed or the window function may not be solved.

[Boundary Attribute Determination Processing]

Figure 7:
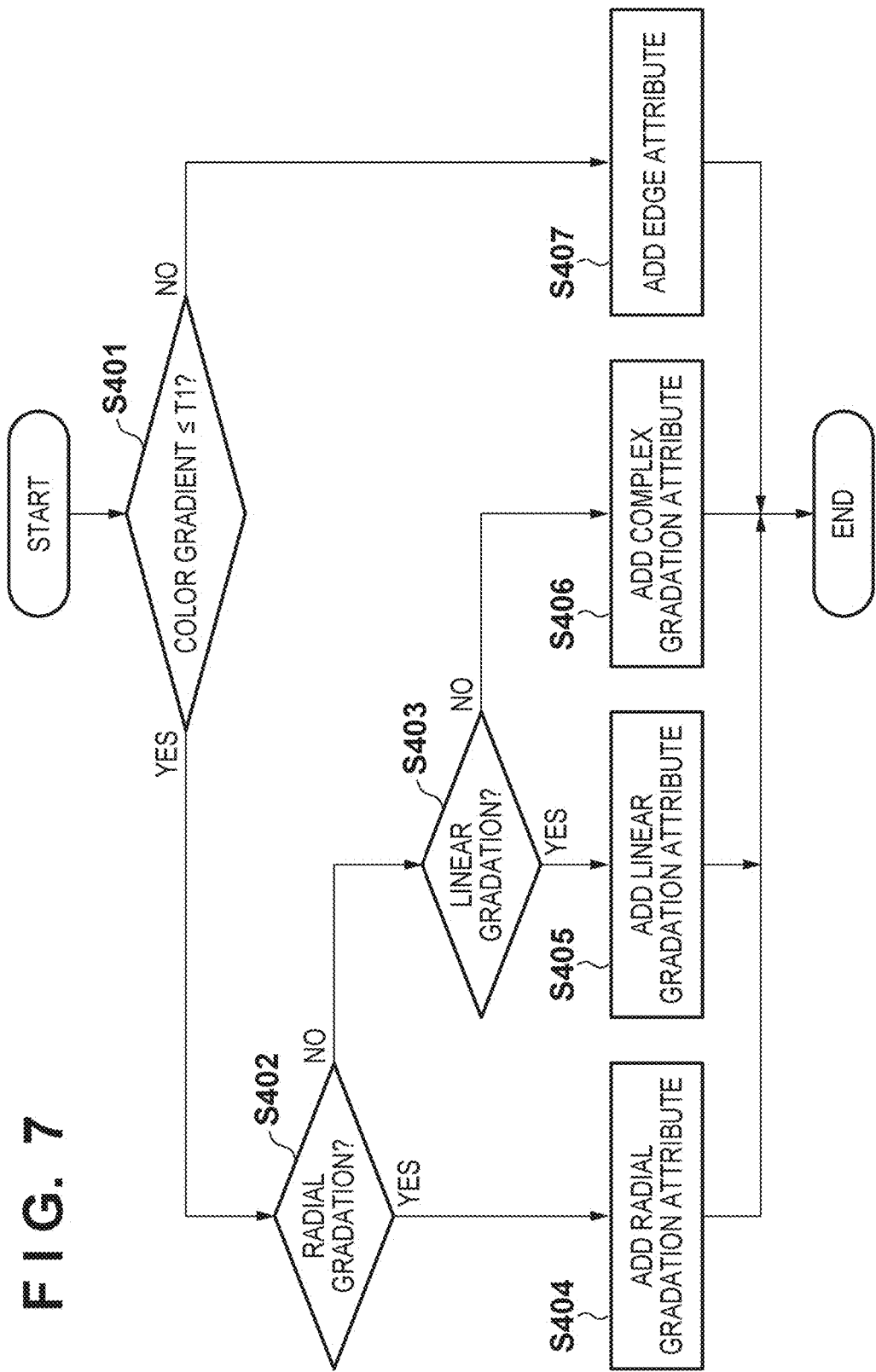
FIG. 7 is a flowchart showing an attribute determination processing sequence according to the first embodiment.

The boundary attribute is determined using the boundary color gradient information in step S400, and the attribute is added. More specifically, the determined attribute of each boundary is saved in association with each boundary of boundary color gradient information. A detailed sequence in step S400 will be explained with reference to FIG. 7.

In step S401, the CPU 7 determines, using boundary color gradient information, which of an edge boundary and pseudo contour boundary is a currently referred boundary. If the average color gradient in the boundary color gradient information obtained in the preceding steps is larger than a predetermined threshold T1, the CPU 7 determines that the currently referred boundary is an edge boundary. An example of the threshold T1 is T1=20. The threshold T1 may be obtained empirically or by an arbitrary calculation equation. If the average color gradient is equal to or smaller than the threshold T1, the CPU 7 determines that the currently referred boundary is a pseudo contour boundary. If the CPU 7 determines that the currently referred boundary is a pseudo contour boundary (YES in step S401), the process advances to step S402. If the CPU 7 determines that the currently referred boundary is an edge boundary (NO in step S401), the process advances to step S407. The "pseudo contour boundary" is a contour formed in a gradation within an image, and is used to divide the gradation region for processing.

In steps S402 and S403, the CPU 7 determines a gradation attribute. In this case, which of gradation regions, that is, a radial gradation, linear gradation, and complex gradation the currently referred pseudo contour boundary belongs to is determined using the characteristic of boundary color gradient information. The "radial gradation" is a gradation in which the color concentrically changes using a given point as a center point, as shown in 8a of FIG. 8. The "linear gradation" is a gradation in which the color changes in a predetermined direction, as shown in 9a and 9c of FIG. 9. The "complex gradation" is a gradation which belongs to neither the radial gradation nor linear gradation, as shown in 10a of FIG. 10.

Figure 8:
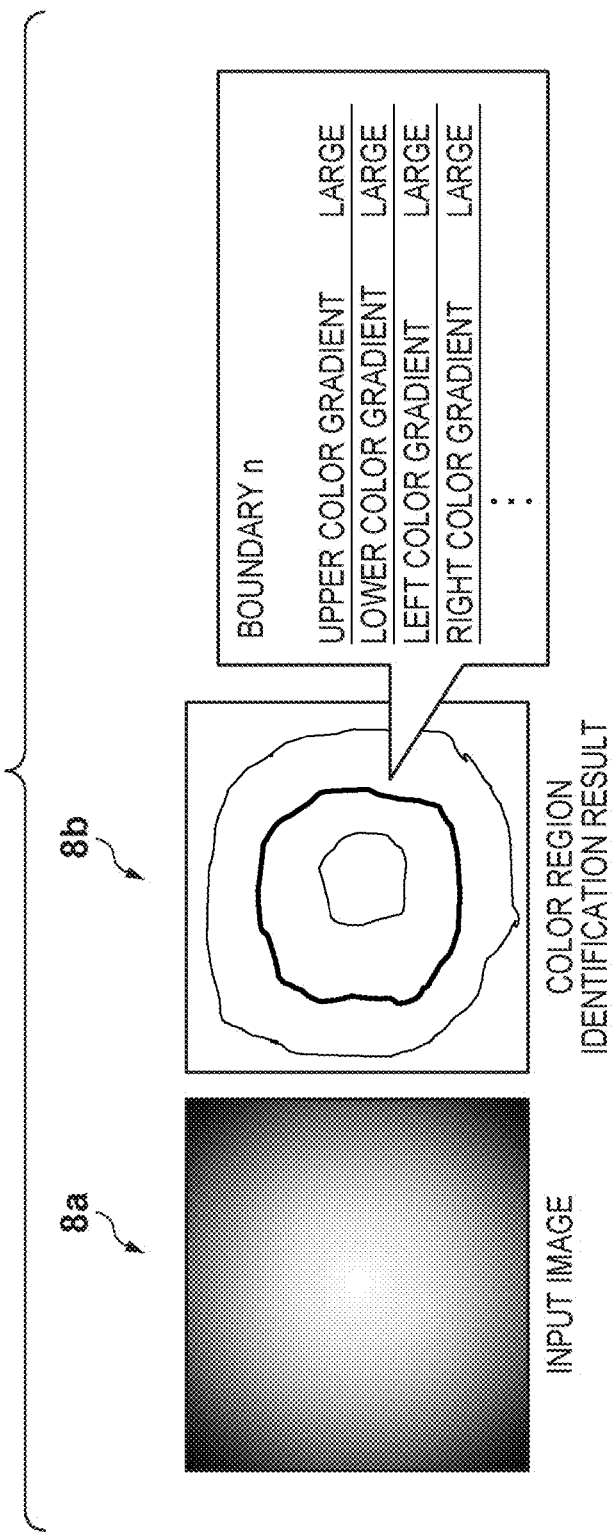
FIG. 8 is a view showing an input example of a radial gradation and the color region identification result according to the first embodiment.

In step S402, the CPU 7 determines whether the currently referred pseudo contour boundary belongs to the radial gradation. When color region identification processing (step S200) is performed for the radial gradation as shown in 8a of FIG. 8, a color region identification result as shown in 8b of FIG. 8 is obtained. Boundary color gradient information calculation processing (step S300) is executed based on the color region identification result to calculate the color gradient of each boundary. Then, color gradients calculated for each boundary take almost the same value in all the upper, lower, right, and left gradient directions, as shown in 8b of FIG. 8. This is because color gradients in the radial gradation take a constant value concentrically, that is, in all the gradient directions. By using this characteristic, if boundary color gradient information of the currently referred pseudo contour boundary satisfies all the following conditions, the CPU 7 determines in step S402 that the currently referred pseudo contour boundary has the radial gradation attribute:

upper color gradient×threshold $T2$>lower color gradient    condition 1:

lower color gradient×threshold $T2$>upper color gradient    condition 2:

right color gradient×threshold $T2$>left color gradient    condition 3:

left color gradient×threshold $T2$>right color gradient    condition 4:

upper color gradient×threshold $T2$>right color gradient    condition 5:

right color gradient×threshold $T2$>upper color gradient    condition 6:

If these six conditions are satisfied, it is considered that color gradients are almost the same in all the upper, lower, right, and left gradient directions of the pseudo contour boundary, and it is determined that the currently referred pseudo contour boundary has the radial gradation attribute. An example of the threshold T2 is T2=2. The threshold T2 may be obtained empirically or by an arbitrary calculation equation. If the CPU 7 determines that the currently referred boundary belongs to the radial gradation (YES in step S402), the process shifts to step S404. If the CPU 7 determines that the currently referred boundary does not belong to the radial gradation (NO in step S402), the process shifts to step S403.

Figure 9:
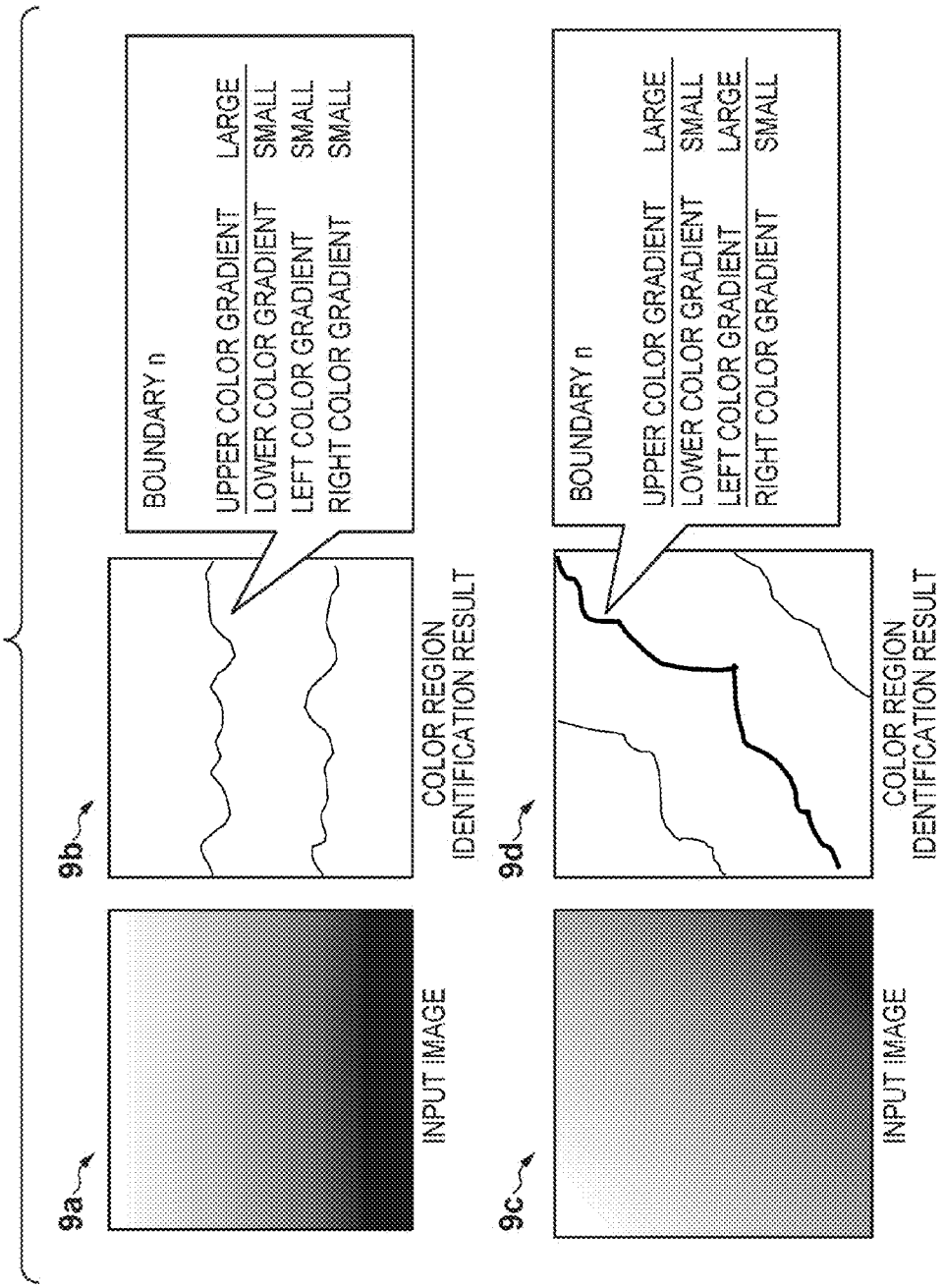
FIG. 9 is a view showing an input example of a linear gradation and the color region identification result according to the first embodiment.

In step S403, the CPU 7 determines whether the currently referred pseudo contour boundary has the linear gradation attribute. When a linear gradation is input, as shown in 9a of FIG. 9 or 9c of FIG. 9, a color region identification result as shown in 9b of FIG. 9 or 9d of FIG. 9 is obtained. Boundary color gradient information calculation processing is executed based on the color region identification result to calculate the color gradient of each boundary. Then, one gradient direction out of the upper, lower, right, and left color gradients as shown in 9b of FIG. 9, or two gradient directions which are not opposite to each other as shown in 9d of FIG. 9 take large values. This is because the color gradient of the linear gradation takes a predetermined gradient direction. By using this characteristic, if boundary color gradient information of the currently referred pseudo contour boundary satisfies either condition 7 (7.1 to 7.3) or condition 8 (8.1 to 8.5), the CPU 7 determines in step S403 that the currently referred pseudo contour boundary has the linear gradation attribute. Note that upper, lower, right, and left color gradients take values G1, G2, G3, and G4 in descending order.

(Condition 7)

$G1$>threshold $T3 \times G2$    condition 7.1:

$G1$>threshold $T3 \times G3$    condition 7.2:

$G1$>threshold $T3 \times G4$    condition 7.3:

(Condition 8)

$G1$>threshold $T4 \times G3$    condition 8.1:

$G1$>threshold $T4 \times G4$    condition 8.2:

$G2$>threshold $T4 \times G3$    condition 8.3:

$G2$>threshold $T4 \times G4$    condition 8.4:

G1 direction and G2 direction are not opposite to each other    condition 8.5:

Examples of the thresholds T3 and T4 are T3=3 and T4=2. The thresholds T3 and T4 may be obtained empirically or by arbitrary calculation equations. If either condition 7 or condition 8 is satisfied and the CPU 7 determines that the currently referred boundary belongs to the linear gradation (YES in step S403), the process shifts to step S405. If the CPU 7 determines that the currently referred boundary does not belong to a linear gradation (NO in step S403), the process shifts to step S406.

In each of steps S404, S405, S406, and S407, the determined attribute is added to boundary attribute information for each boundary. More specifically, in step S404, the CPU 7 adds the radial gradation attribute to the determination target boundary. In step S405, the CPU 7 adds the linear gradation attribute to the determination target boundary. In step S406, the CPU 7 adds the complex gradation attribute to the determination target boundary. In step S407, the CPU 7 adds the edge attribute to the determination target boundary. After the end of the processing in one of steps S404, S405, S406, and S407, the processing sequence ends. The processes in steps S401 to S407 implement boundary attribute determination processing (step S400) in FIG. 1.

[Gradation Cluster Information Generation Processing]

Figure 11:
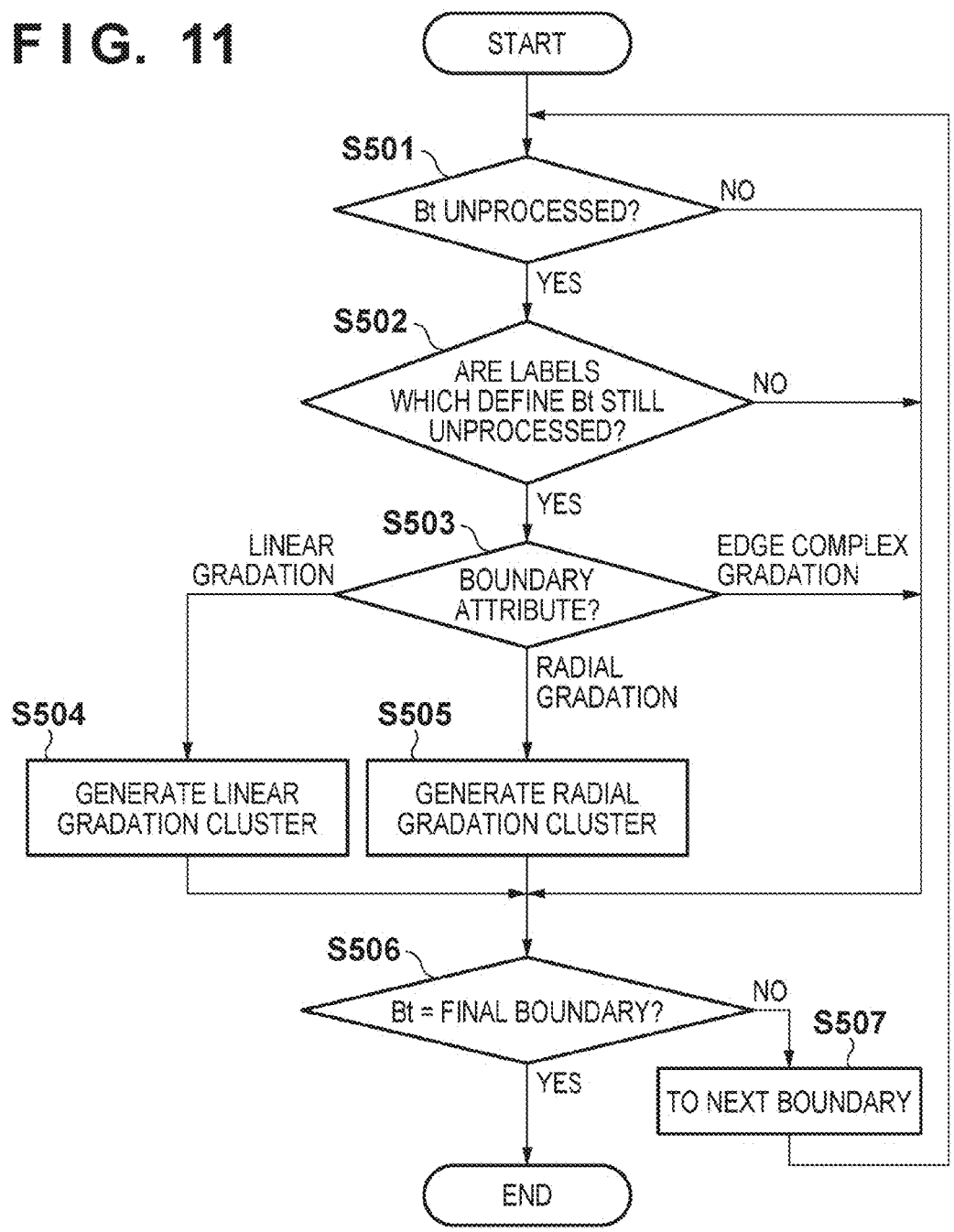
FIG. 11 is a flowchart showing a gradation cluster information generation processing sequence according to the first embodiment.

In step S500, a gradation region represented by a gradation of the same type (same attribute) is identified, and gradation cluster information generation processing is performed to generate cluster information corresponding to the gradation region. In the embodiment, the gradation cluster information includes a list of labels indicating color regions in a gradation region, a list of boundaries in the gradation region, and the type of corresponding gradation region. Details of step S500 will be explained with reference to a processing sequence in FIG. 11 by exemplifying a case in which an input image in 12a of FIG. 12 is input.

Figure 12:
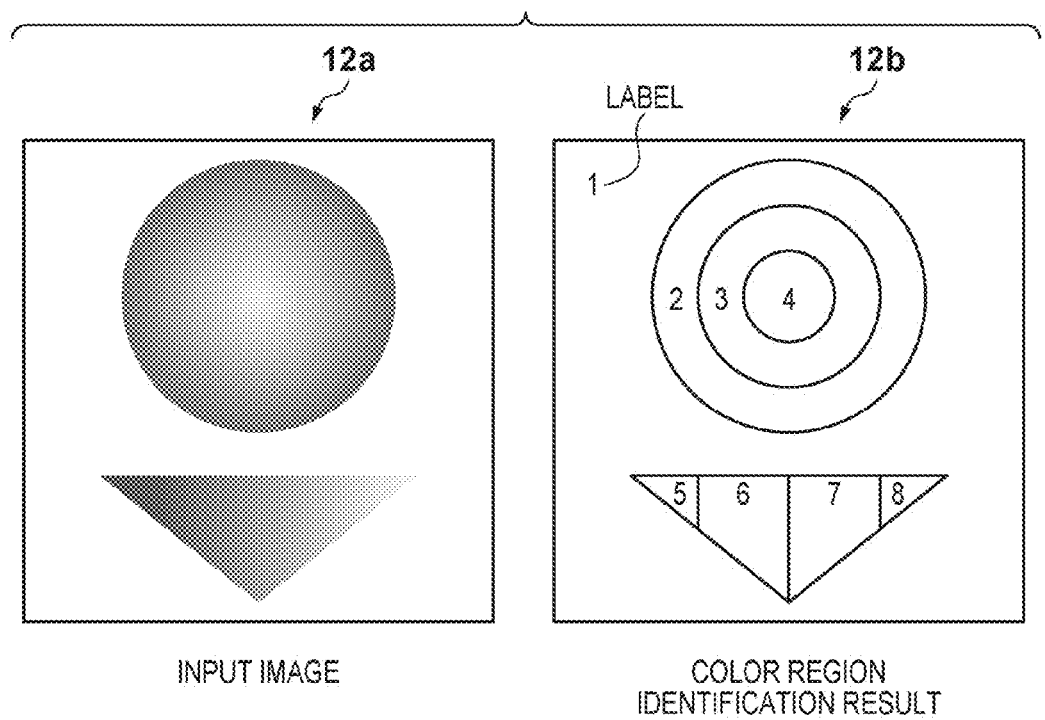
FIG. 12 is a view showing an example of gradation cluster information generation processing according to the first embodiment.

When the input image in 12a of FIG. 12 is input, a color region identification result shown in 12b of FIG. 12 is obtained by color region identification processing (step S200). This result undergoes boundary color gradient information calculation processing (step S300) and boundary attribute determination processing (step S400), obtaining information as shown in FIG. 13. A boundary of interest in input information will be referred to as Bt.

In step S501, the CPU 7 determines whether the currently referred boundary Bt is still unprocessed. This processing is necessary not to process again a processed boundary because there is a boundary which is processed preferentially in subsequent gradation cluster information generation processing. If the CPU 7 determines that the currently referred boundary Bt is still unprocessed (YES in step S501), the process shifts to step S502. If the CPU 7 determines that the currently referred boundary Bt has been processed (NO in step S501), the process shifts to step S506.

In step S502, the CPU 7 determines whether two label regions which define the currently referred boundary Bt are still unprocessed. Similar to step S501, this processing is necessary not to process again two labels which define a processed boundary because there is a boundary which is processed preferentially in subsequent gradation cluster information generation processing. If the CPU 7 determines that labels which define the boundary Bt (that is, two label regions which sandwich the boundary Bt) are still unprocessed (YES in step S502), the process shifts to step S503. If the CPU 7 determines that labels which define the boundary Bt have been processed (NO in step S502), the process shifts to step S506.

In step S503, the CPU 7 determines a boundary attribute. If an attribute associated with the currently referred boundary Bt is "linear gradation", the process shifts to step S504; if it is "radial gradation", to step S505; otherwise, to step S506.

In step S504, the CPU 7 generates linear gradation cluster information. First, the CPU 7 registers the boundary number of the currently referred boundary Bt in linear gradation cluster information. Then, the CPU 7 registers, in linear gradation cluster information, two labels which define the currently referred boundary Bt. The CPU 7 calculates a gradient angle specific to the generated linear gradation cluster information. The gradient angle at this time is obtained using upper, lower, right, and left color gradients in boundary color gradient information according to equation (1):

gradient angle=arctan((upper color gradient−lower color gradient)/(right color gradient−left color gradient)) (1)

The CPU 7 sets "linear gradation" in the type in the generated linear gradation cluster information. For convenience, the cluster of a boundary for which the linear gradation is set will be referred to as linear gradation cluster information G1.

When at least either of color regions corresponding to the two labels registered in the linear gradation cluster information further contacts still other color regions, the CPU 7 sequentially evaluates boundaries with the other color regions to determine whether to register the other color regions in the linear gradation cluster information. This processing will be described using an example in FIG. 13.

Assume that the currently referred boundary Bt is boundary 8 in FIG. 13. At this time, boundary 8, and label 5 and label 6 which define boundary 8 are registered in the linear gradation cluster information G1. The gradient angle in this case is obtained using the above-mentioned equation (1):

gradient angle=arctan((0−0)/(800−0))=0

By referring to the boundary color gradient information in FIG. 13, it is determined that label 5 contacts boundary 4, in addition to currently referred boundary 8. It is determined whether boundary 4 belongs to the generated linear gradation cluster information G1. At this time, the boundary attribute of boundary 4 is the edge attribute, so it is determined that boundary 4 does not belong to the linear gradation cluster information G1.

Also, based on the boundary color gradient information in FIG. 13, it is determined that label 6 contacts boundary 5 and boundary 9, in addition to boundary 8. Although boundary 5 has the edge attribute and does not belong to the linear gradation cluster information G1, boundary 9 has the linear gradation attribute. Thus, it is determined whether boundary 9 belongs to the linear gradation cluster information G1. More specifically, it is determined whether label 6 and label 7 which define boundary 9 are contained in another gradation cluster information. If label 6 and label 7 are contained in another gradation cluster information, it is determined that boundary 9 does not belong to gradation cluster information during generation. If neither label 6 nor label 7 is contained in another gradation cluster information, the determination shifts to the next label. The gradient angle of boundary 9 can be calculated using equation (1). That is, the gradient angle of boundary 9 is calculated as follows:

gradient angle=arctan((0−0)/(1200−0))=0

If the difference between the obtained gradient angle and a gradient angle specific to the linear gradation cluster information is equal to or smaller than a threshold T5, the boundary and labels which define it are registered in the linear gradation cluster information. An example of the threshold T5 is T5=22.5. The threshold T5 may be obtained empirically or by an arbitrary calculation equation. Since the difference between the gradient angle of boundary 9 in FIG. 13 and that of the linear gradation cluster information is 0, it is determined that boundary 9 belongs to the linear gradation cluster information G1. Thus, boundary 9, and label 6 and label 7 which define boundary 9 are registered in the linear gradation cluster information G1. However, label 6 has already been registered in the linear gradation cluster information during generation, so only label 7 is registered. Determination of whether the difference is larger than a predetermined threshold or is equal to or larger than the threshold can be changed in accordance with the threshold setting.

A boundary to which label 7 belongs is evaluated in the same way and registered as a linear gradation, obtaining the result such as gradation cluster 2 in gradation cluster information shown in FIG. 14. In the example of FIG. 14, gradation cluster 2 is a linear gradation which is formed from color regions of labels 5, 6, 7, and 8 and has a gradient angle of 0°. Note that the "type" shown in FIG. 14 corresponds to the gradation attribute of each boundary, and is the attribute of a gradation cluster. After generating the linear gradation cluster information by the above processing, the process shifts to step S506.

In step S505, the CPU 7 generates radial gradation cluster information. First, the CPU 7 registers the boundary number of the currently referred boundary Bt in radial gradation cluster information. Then, the CPU 7 registers, in gradation cluster information, two labels which define the currently referred boundary Bt. Since the generated radial gradation cluster information does not require a gradient angle, the CPU 7 substitutes a dummy value as an initial value. The CPU 7 sets "radial gradation" in the type in the generated radial gradation cluster information. For convenience, the cluster of a boundary for which the radial gradation is set will be referred to as radial gradation cluster information Gr.

When at least either of color regions corresponding to the two labels registered in the radial gradation cluster information further contacts still other color regions, the CPU 7 sequentially evaluates boundaries with the other color regions to determine whether to register the other color regions in the radial gradation cluster information. This processing will be explained using the example in FIG. 13.

Assume that the currently referred boundary Bt is boundary 2 in FIG. 13. At this time, boundary 2, and label 2 and label 3 which define boundary 2 are registered in the radial gradation cluster information Gr. By referring to the boundary color gradient information in FIG. 13, it is determined that label 2 contacts boundary 1, in addition to currently referred boundary 2. It is then determined whether boundary 1 belongs to the generated radial gradation cluster information Gr. At this time, the boundary attribute of boundary 1 is the edge attribute, so it is determined that boundary 1 does not belong to the radial gradation cluster information Gr.

Also, based on the boundary color gradient information in FIG. 13, it is determined that label 3 contacts boundary 3, in addition to currently referred boundary 2. Boundary 3 has the radial gradation attribute. It is therefore determined whether boundary 3 belongs to the radial gradation cluster information Gr. More specifically, it is determined whether label 3 and label 4 which define boundary 3 are contained in another gradation cluster information. If label 3 and label 4 are contained in another gradation information, it is determined that boundary 3 does not belong to gradation cluster information during generation. If neither label 3 nor label 4 is contained in another gradation cluster information, boundary 3, and labels which define boundary 3 are registered in the radial gradation cluster information Gr. However, label 3 has already been registered in the radial gradation cluster information during generation, so only label 4 is registered.

A boundary to which label 4 belongs is evaluated in the same way and registered as a radial gradation, obtaining the result such as gradation cluster 1 in gradation cluster information shown in FIG. 14. Gradation cluster 1 in FIG. 14 is registered as a radial gradation cluster formed from color regions of labels 2, 3, and 4. After generating the radial gradation cluster information by the above processing, the process shifts to step S506.

In step S506, the CPU 7 determines whether the currently referred boundary is the final boundary. If the currently referred boundary is the final boundary (YES in step S506), the process ends without any further processing; if it is not the final boundary (NO in step S506), shifts to step S507. In step S507, the CPU 7 updates the currently referred boundary to the next boundary, and the process returns to step S501. Steps S501 to S507 implement gradation cluster information generation processing (step S500) in FIG. 1.

[Gradation Parameter Generation Processing]

In step S600, gradation parameter generation processing is performed to generate gradation parameters for each gradation cluster information. In this case, the parameters of the linear gradation and radial gradation are generated using the color region identification result, gradation cluster information, and boundary color gradient information.

Figures 15, 16:
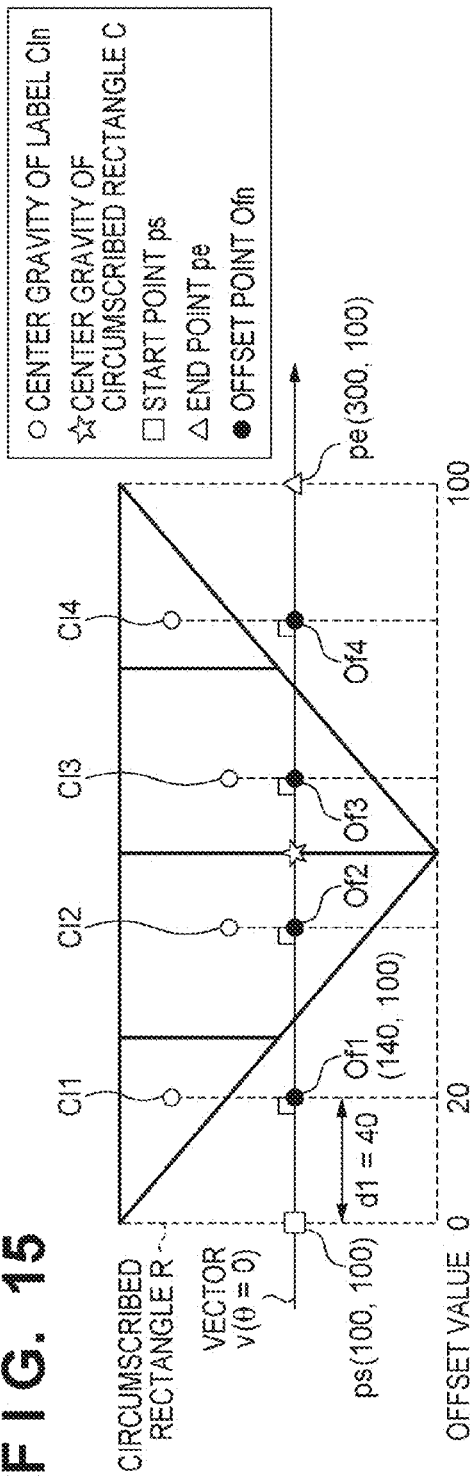
FIG. 15 is a conceptual view showing generation of linear gradation parameters according to the first embodiment.
FIG. 16 is a table showing an example of linear gradation parameters according to the first embodiment.

Details of a parameter generation method when the type in gradation cluster information is "linear gradation" will be explained. FIG. 15 is a conceptual view showing generation of parameters in, for example, the linear gradation region of FIG. 12. Linear gradation parameters to be generated are a start point ps and end point pe which define gradation end points, and an offset which defines a change of color. Note that the offset contains an offset value indicating a relative position in a gradation region as position information, and a color value which defines a color at the relative position.

First, the circumscribed rectangle R of a linear gradation region (region defined by labels registered in linear gradation cluster information) is obtained, and the gravity center C of the circumscribed rectangle R is obtained. Note that a description of the gravity center obtaining method will be omitted. Then, a vector v which passes through the obtained gravity center C and has a gradient angle added to gradation cluster information as the angle θ is obtained. Intersection points with the circumscribed rectangle R are defined as the start point ps(a, b) and the end point pe(c, d). The distance from the obtained start point ps to end point pe is obtained, and a constant K for normalization which assumes this distance to be 100 is obtained. The constant K can be obtained using equation (2):

$$K = \frac{100}{\sqrt{(c-a)^2 + (d-b)^2}} \tag{2}$$

In the example shown in FIG. 15, the constant K for normalization is given by $$K = \frac{100}{\sqrt{(300-100)^2 + (100-100)^2}} = 0.5$$

Thereafter, the gravity centers Cln (n=1, 2, ..., N) of color regions corresponding to respective labels are obtained for N labels registered in gradation cluster information. In the example shown in FIG. 15, C11 to C14 are contained. Then, normals are dropped to the vector v from the obtained gravity centers Cln of the respective color regions, and intersection points are derived as offset points Ofn (n=1, 2, ..., N). In the example shown in FIG. 15, Of1 to Of4 are contained. Distances do (n=1, 2, ..., N) from the start point ps to the offset points Ofn are calculated, and values obtained by multiplying the distances do by the above-described constant K are set as offset values at the offset points Ofn.

In the example of FIG. 15, the distance d1 between Of1 (140, 100) and ps(100, 100) is 40. Since the constant K is 0.5, as described above, the offset value at Of1 is 0.5×40=20. Finally, the average color of a color region corresponding to the offset point Ofn is used as the color value of the offset. In the example of FIG. 15, the above-described processing is executed for all offset points Ofn, obtaining linear gradation parameters as exemplified in FIG. 16. As shown in FIG. 16, in the embodiment, the linear gradation parameters include end point information (coordinates of start and end points) of the gradation, and information (offset value and color value) of each offset.

Figure 17:
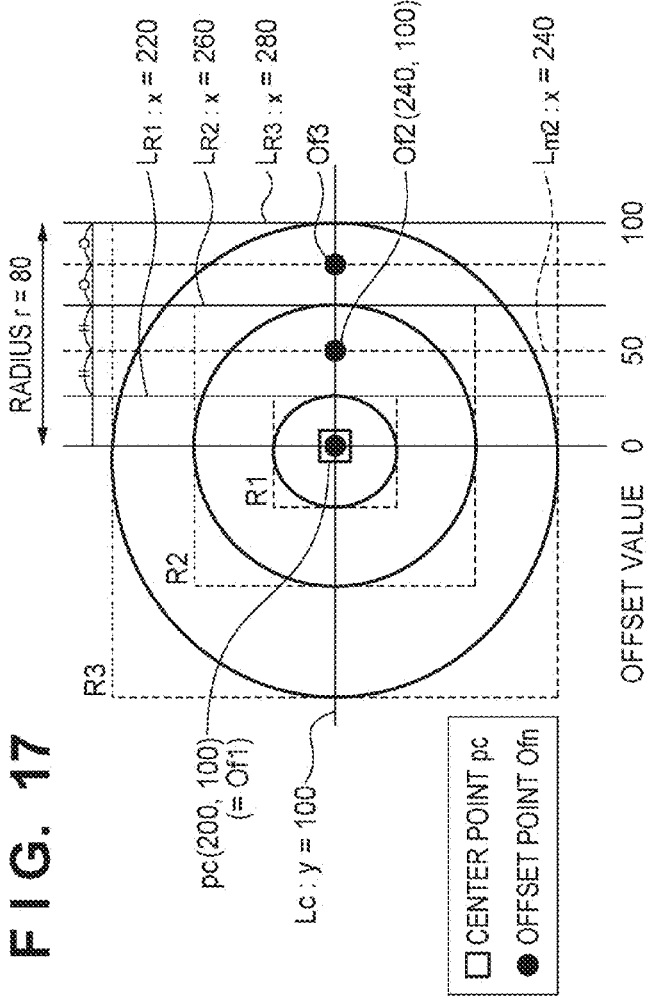
FIG. 17 is a conceptual view showing generation of radial gradation parameters according to the first embodiment.

Details of a parameter generation method when the type in gradation cluster information is "radial gradation" will be explained. FIG. 17 is a conceptual view showing generation of parameters in, for example, the radial gradation region of FIG. 12. Radial gradation parameters to be generated are a center point pc and radius r which define gradation end points, and an offset which defines a change of color. Note that the offset contains an offset value indicating a relative position in a gradation region as position information, and a color value which defines a color at the relative position.

First, the circumscribed rectangles of respective color regions corresponding to N labels registered in radial gradation cluster information are obtained and sorted as Rn (n=1, 2, . . . , N) in the size order. In the example of FIG. 17, the circumscribed rectangles are R1, R2, and R3.

The obtained circumscribed rectangle R1 is a circumscribed rectangle corresponding to an innermost color region. The gravity center of the corresponding color region is obtained and defined as the center point pc of the radial gradation. The obtained circumscribed rectangle RN is a circumscribed rectangle corresponding to an outermost color region. The distance to the center point pc from a straight line LRN which defines the right end of the circumscribed rectangle is set as the radius r. In the example of FIG. 17, the distance from the center point pc(200, 100) to the straight line LR3 (x=280) which defines the right end of the circumscribed rectangle R3 of the outermost color region is 80, and this value is set as the radius r.

After that, the constant K for normalization which assumes this radius r to be 100 is obtained. The constant K can be obtained using equation (3):

$$K = \frac{100}{r} \quad (3)$$

In the example of FIG. 17, the constant K for normalization is given by $$K = \frac{100}{80} = 1.25$$

Then, the offset Ofn (n=1, 2, . . . , N) of the radial gradation is obtained. As for the offset in the radial gradation, the first offset point Of1 is set as the same point as the center point pc, and the offset value is set to 0. A method of generating offset points from the second offset point will be explained.

A straight line Lc which passes through the center point pc and is parallel to the x-axis is defined. Assuming that an offset point during generation is the ith offset point (i=2, 3, . . . , N), a straight line Lmi which passes through a middle point between a straight line LRi−1 that defines the right end of a circumscribed rectangle Ri−1 and a straight line LRi that defines the right end of a circumscribed rectangle Ri is calculated. Then, the intersection point between the obtained straight line Lmi and the straight line Lc is obtained and set as the offset point Ofi. In the example of FIG. 17, the straight line Lc which passes through the center point pc(200, 100) and is parallel to the x-axis is y=100. For i=2, the straight line Lm2 which passes through a middle point between the straight line LR1 (x=220) and the straight line LR2 (x=260) is x=240. Hence, the offset point Of2 is the intersection point (240, 100) between the straight lines Lc and Lm2. By this processing, offset points Ofn are generated by the number N of labels. In the example shown in b of FIG. 17, Of1 to Of3 are contained.

Then, distances dn (n=1, 2, . . . , N) from the start point pc to the offset points Ofn are calculated, and values obtained by multiplying the distances dn by the above-described constant K are set as offset values. In the example of FIG. 17, since Of1 is the same point as the center point pc, the distance d1=0 and the offset value is 0 regardless of the constant K. The distance d2 between Of2(240, 100) and the center point pc(200, 100) is 40. Since the constant K is 1.25, as described above, the offset value at Of2 is 1.25×60=50. Finally, the average color of a color region corresponding to the offset point Ofn is used as the color value of the offset.

Figure 18:
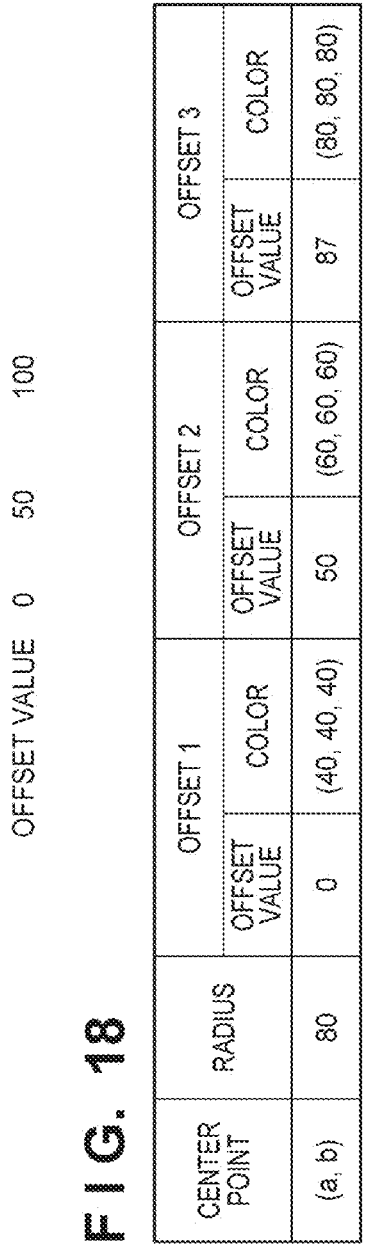
FIG. 18 is a table showing an example of radial gradation parameters according to the first embodiment.

The above-described processing is executed for all offset points Ofn, obtaining radial gradation parameters as exemplified in FIG. 18. As shown in FIG. 18, in the embodiment, the radial gradation parameters include the center point coordinates and radius of the radial gradation, and information (offset value and color value) of each offset. The above processing implements gradation parameter generation processing (step S600) in FIG. 1.

[Color Region Integration Processing]

Figure 19:
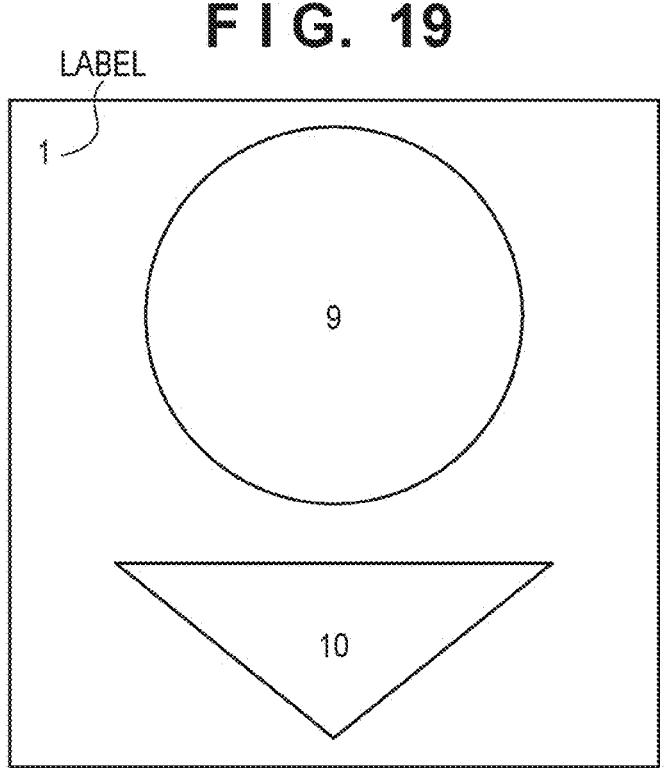
FIG. 19 is a view showing an example of a new color region identification result after color region integration processing according to the first embodiment.

In step S700, color region integration processing is performed to integrate color regions indicated by labels into one for each gradation cluster information. In this processing, labels registered in each gradation cluster information are integrated into one, obtaining a new color region identification result. This will be described with reference to FIGS. 12 and 14. Labels 2, 3, and 4 are registered in gradation cluster 1. Color regions indicated by these labels are integrated into one color region, and label 9 is assigned as a new label to it. Similarly, labels 5, 6, 7, and 8 registered in gradation cluster 2 are integrated, and label 10 is assigned as a new label. This processing generates label-assigned color regions as shown in FIG. 19, removing a pseudo contour boundary which does not exist in the original image. Gradation cluster information reveals that label 9 is a radial gradation region and label 10 is a linear gradation region. This processing implements color region integration processing (step S700) in FIG. 1.

[Contour Vector Description Generation Processing]

Finally in step S800 of FIG. 1, contour vector description generation processing is performed to generate the contour vector description of a color region. A color region for which the contour vector is to be obtained is a color region obtained after color region integration in step S700. First, the boundary between color regions after integration in step S700 is obtained and approximated by a function, generating a vector description (contour vector data) representing the contour of each color region. When the vector description is obtained by approximating a boundary by a function for each section in which adjacent color regions contact each other, a contour vector description free from a gap or overlap between the adjacent color regions can be obtained. In the example of FIG. 19, the boundary between color regions of label 1 and label 9, and that between color regions of label 1 and label 10 are obtained and approximated by a function, obtaining the contour vector descriptions of the respective color regions.

For a gradation region belonging to a gradation cluster, the obtained contour vector description, and the gradation parameters which have been obtained in step S600 to represent a gradation by a vector are output together. That is, vector data of the gradation region (gradated contour vector data) is generated by describing the inside of a contour defined by the contour vector description of the color region so that the gradation is represented by the gradation parameters. For a color region (color region of a single color surrounded by a boundary having the edge attribute) other than the gradation region, the representative color of the color region (for example, the average color of the color region) is obtained, and the contour vector description and representative color of the color region are output together, generating vector data of the color region other than the gradation region. In this fashion, the result of vectorizing an image containing the gradation region can be obtained.

Figure 20:
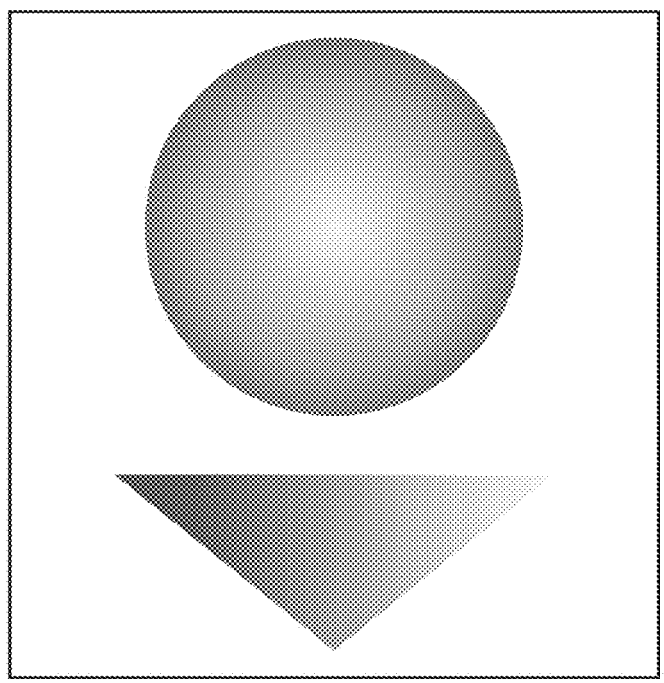
FIG. 20 is a view showing a vector image obtained by rendering a vectorization result.

The vectorization result obtained by the above processing is rendered, obtaining a vector image as shown in FIG. 20.

As described above, a gradation region in an image can be identified quickly, and gradation parameters corresponding to the feature of the gradation region can be generated.

Second Embodiment

In the first embodiment, the offset value of a linear gradation is generated using the gravity center of a color region, and the average color of the color region is used as the color value of the offset. However, this method does not add a color to the start and end points (end portions) of a linear gradation, and a difference from an original image stands out in some cases. This also applies to a radial gradation. Since the average color of a color region is the color value of the offset, a difference from an original image is generated at the center and end points of the gradation.

Figure 21:
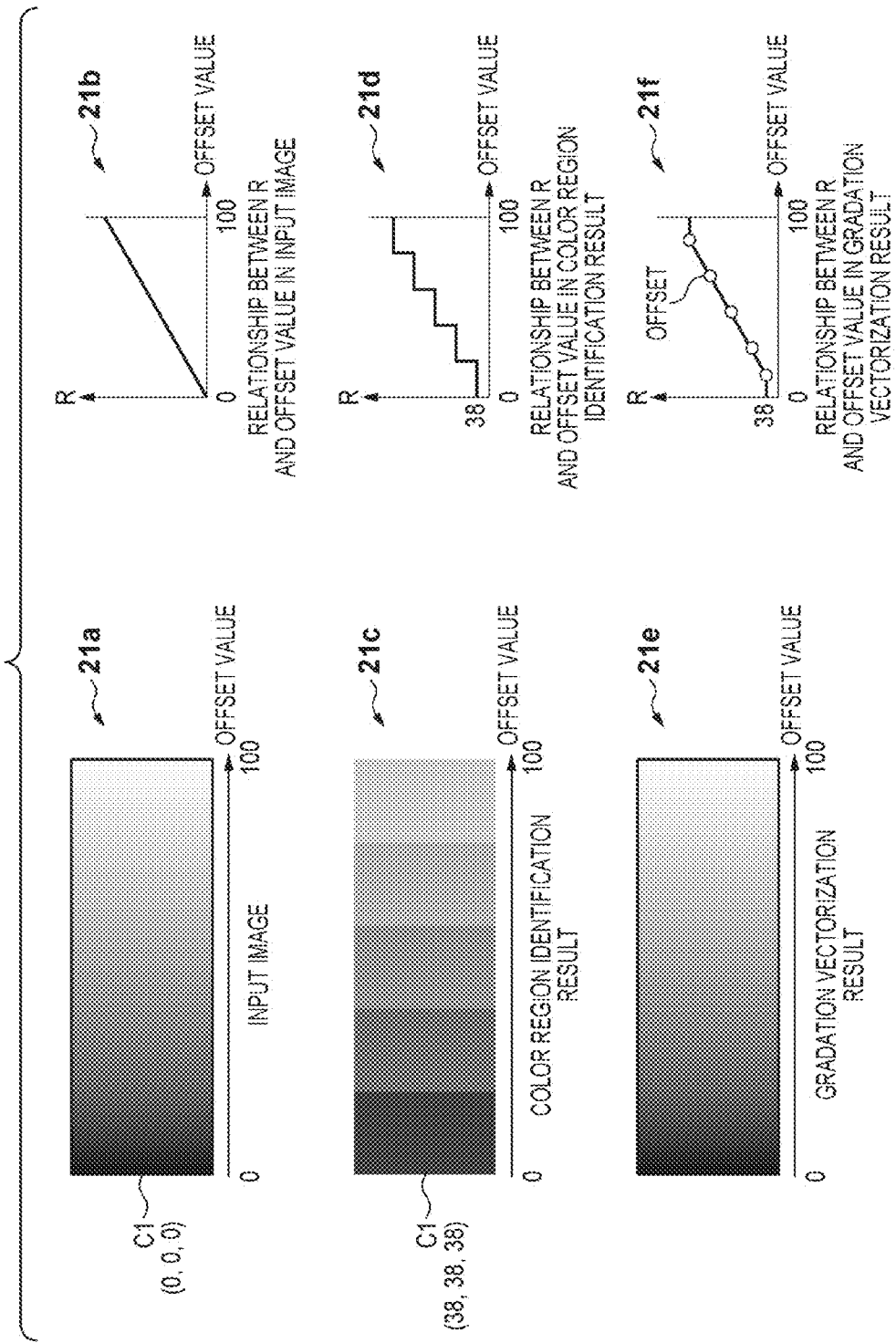
FIG. 21 is a conceptual view showing vectorization of a linear gradation according to the first embodiment.

Assume that in an input linear gradation image, the R, G, and B values start from C1(0, 0, 0) and the color changes in a direction parallel to the x-axis, as shown in 21*a* of FIG. 21. The left end of this input is defined as an offset value of 0, and the right end is defined as an offset value of 100. At this time, for example, the relationship between the R value and the offset is graphed, obtaining a graph as shown in 21*b* of FIG. 21. The input image undergoes color region identification processing, and the average color of each color region is obtained, obtaining a result as shown in 21*c* of FIG. 21. At this time, for example, the relationship between the R value and the offset is graphed, obtaining a graph as shown in 21*d* of FIG. 21. Gradation vectorization described in the first embodiment is executed in accordance with the obtained color region identification result, obtaining a result as shown in 21*e* of FIG. 21. A comparison between the left end of the gradation vectorization result and that of the input image reveals that the color differs between them. This also applies to the right ends. For example, the relationship between the R value and the offset is graphed, as shown in 21*f* of FIG. 21. The graph reveals that the color does not change near an offset value of 0 and an offset value of 100. This is because the offset is set from only the gravity center of a color region and is not set at start and end points in the first embodiment, as described above.

[Offset Complement Processing]

Figure 24:
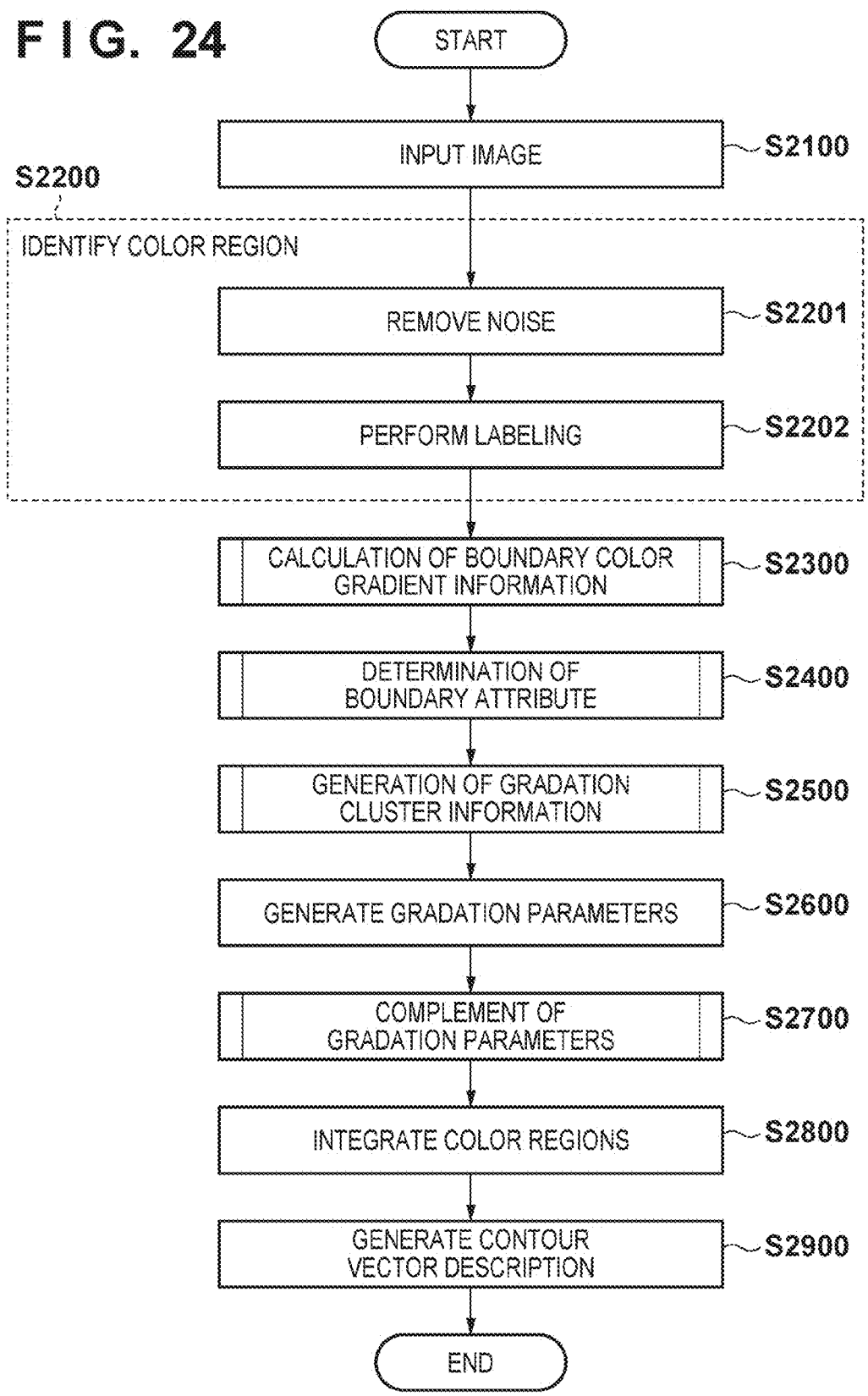
FIG. 24 is a flowchart showing main processing according to the second embodiment.

To solve this problem, the second embodiment complements the offset after generating gradation parameters. This processing will be explained with reference to a processing sequence in FIG. 24. This processing sequence is implemented by executing a program stored in a storage unit by a CPU 7. Note that the same processes as those in the first embodiment are executed in steps S2100 to S2600, and a description thereof will not be repeated.

Figure 25:
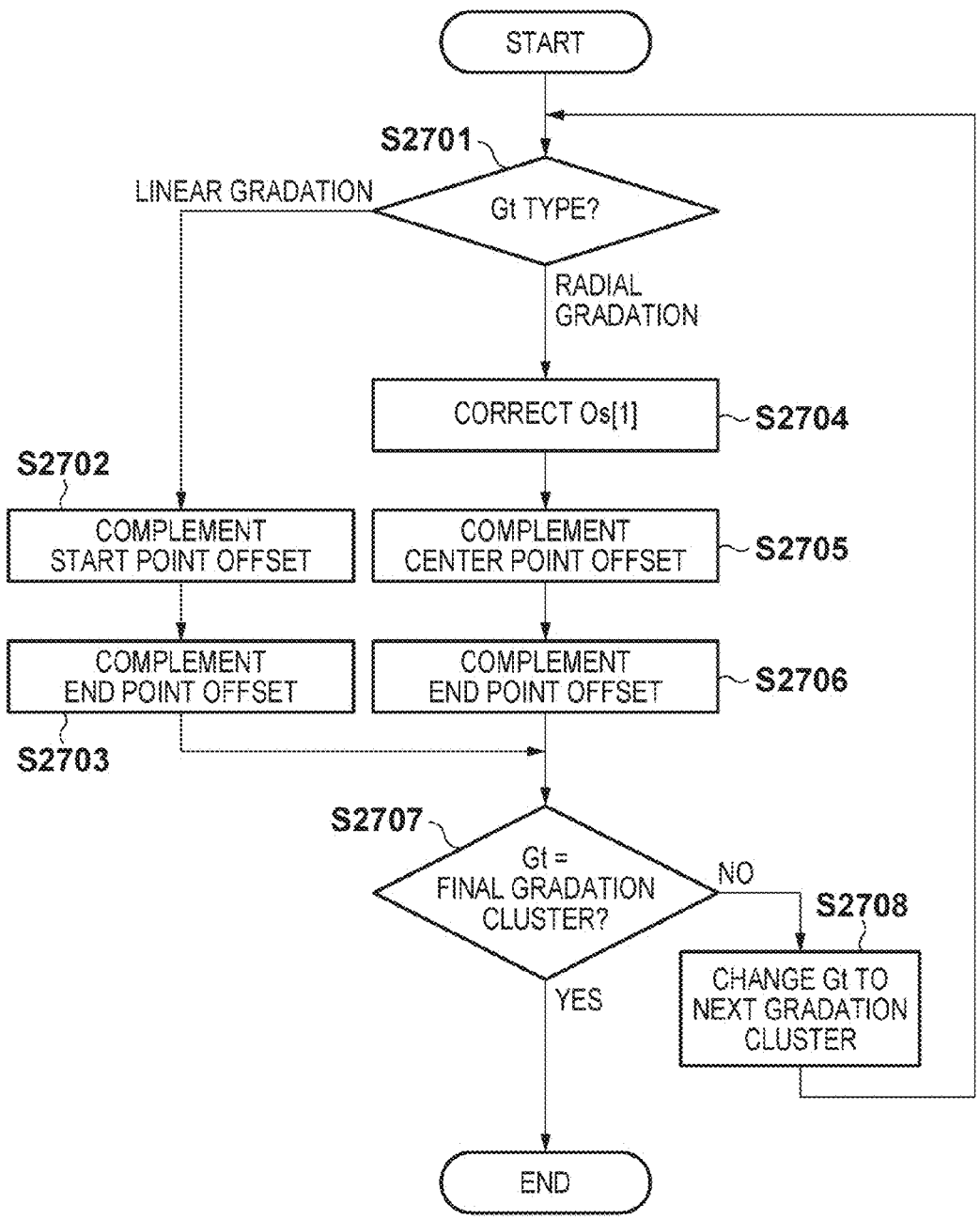
FIG. 25 is a flowchart showing an offset complement sequence according to the second embodiment.

In step S2700, the CPU 7 complements gradation parameters obtained in step S2600. The detailed processing sequence of the gradation parameter complement processing will be explained with reference to FIG. 25. Prior to the description, N obtained offsets will be referred to as Os[n] (n=1, 2, . . . , N) in ascending order from an offset having a smallest offset value. The offset value in the offset Os[n] will be referred to as Os[n]_val, and the R, G, and B values in the offset Os[n] will be referred to as Os[n]_r, Os[n]_g, and Os[n]_b. Also, currently referred gradation cluster information will be referred to as Gt.

In step S2701, the CPU 7 determines the type of currently referred gradation cluster information. If the type is "linear gradation", the process shifts to step S2702; if it is "radial gradation", to step S2704. In step S2702, the CPU 7 complements an offset Oss at the gradation start point of the linear gradation. Since the offset value at the start point of the linear gradation is always 0, the CPU 7 sets 0 in Oss_val. Then, the CPU 7 estimates color values in Oss from changes of the color values in an offset near the start point. The R, G, and B values Oss_r, Oss_g, and Oss_b in Oss can be calculated using equations (4):

$$Oss\_r = Os[1]\_r - \frac{Os[2]\_r - Os[1]\_r}{Os[2]\_val - Os[1]\_val} Os[1]\_val \quad (4)$$

$$Oss\_g = Os[1]\_g - \frac{Os[2]\_g - Os[1]\_g}{Os[2]\_val - Os[1]\_val} Os[1]\_val$$

$$Oss\_b = Os[1]\_b - \frac{Os[2]\_b - Os[1]\_b}{Os[2]\_val - Os[1]\_val} Os[1]\_val$$

Figure 22:
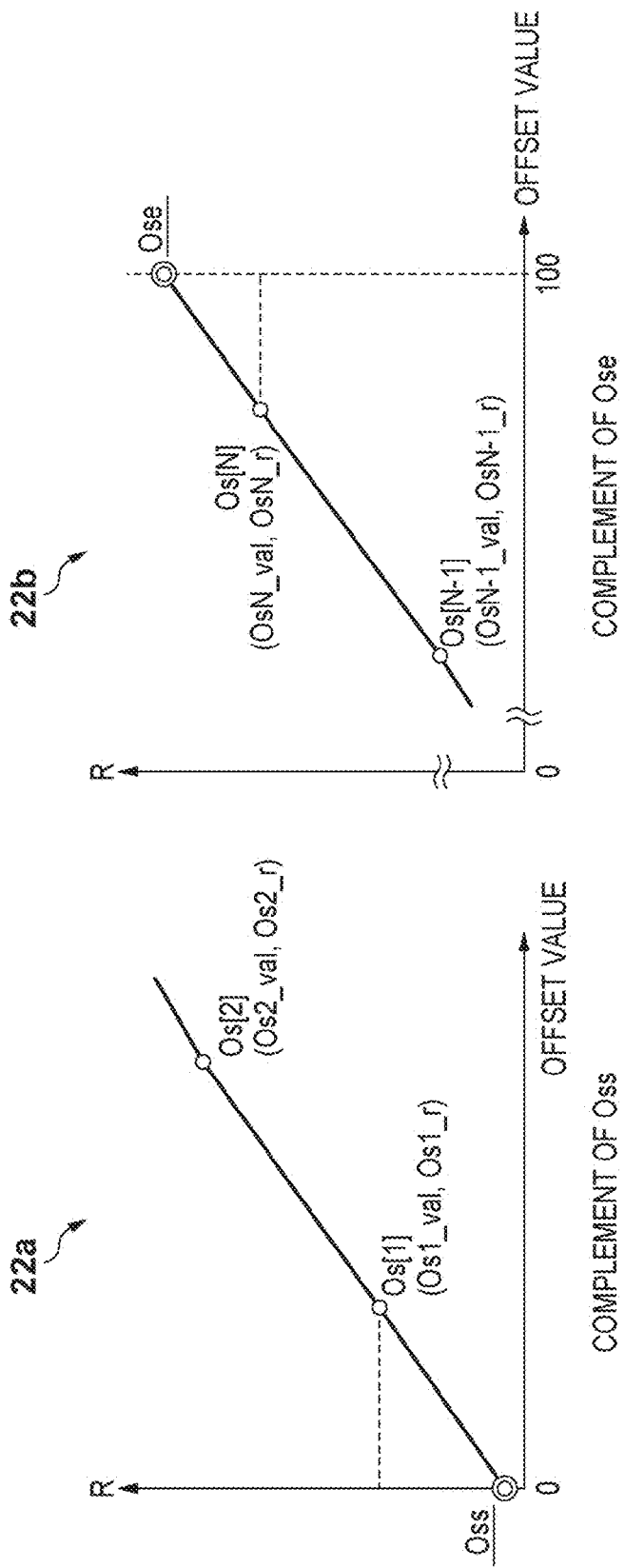
FIG. 22 is a conceptual view showing complement of offsets at the start and end points of a linear gradation according to the second embodiment.

By the above processing, the offset at the start point such as Oss exemplified in 22*a* of FIG. 22 can be estimated. After the end of this processing, the process shifts to step S2703.

In step S2703, the CPU 7 complements an offset Ose at the end point of the linear gradation. Since the offset value at the end point of the linear gradation is always 100, the CPU 7 sets 100 in Ose_val. Then, the CPU 7 estimates color values in Ose from changes of the color values in an offset near the end point. The R, G, and B values Ose_r, Ose_g, and Ose_b in Ose can be calculated using equations (5):

$$Ose\_r = \quad (5)$$
$$Os[N-1]\_r - \frac{Os[N]\_r - Os[N-1]\_r}{Os[N]\_val - Os[N-1]\_val}(100 - Os[N-1]\_val)$$
$$Ose\_g = Os[N-1]\_g -$$
$$\frac{Os[N]\_g - Os[N-1]\_g}{Os[N]\_val - Os[N-1]\_val}(100 - Os[N-1]\_val)$$
$$Ose\_b = Os[N-1]\_b -$$
$$\frac{Os[N]\_b - Os[N-1]\_b}{Os[N]\_val - Os[N-1]\_val}(100 - Os[N-1]\_val)$$

By the above processing, the offset at the end point such as Ose exemplified in 22*b* of FIG. 22 can be estimated. After the end of this processing, the process shifts to step S2707.

Figure 23:
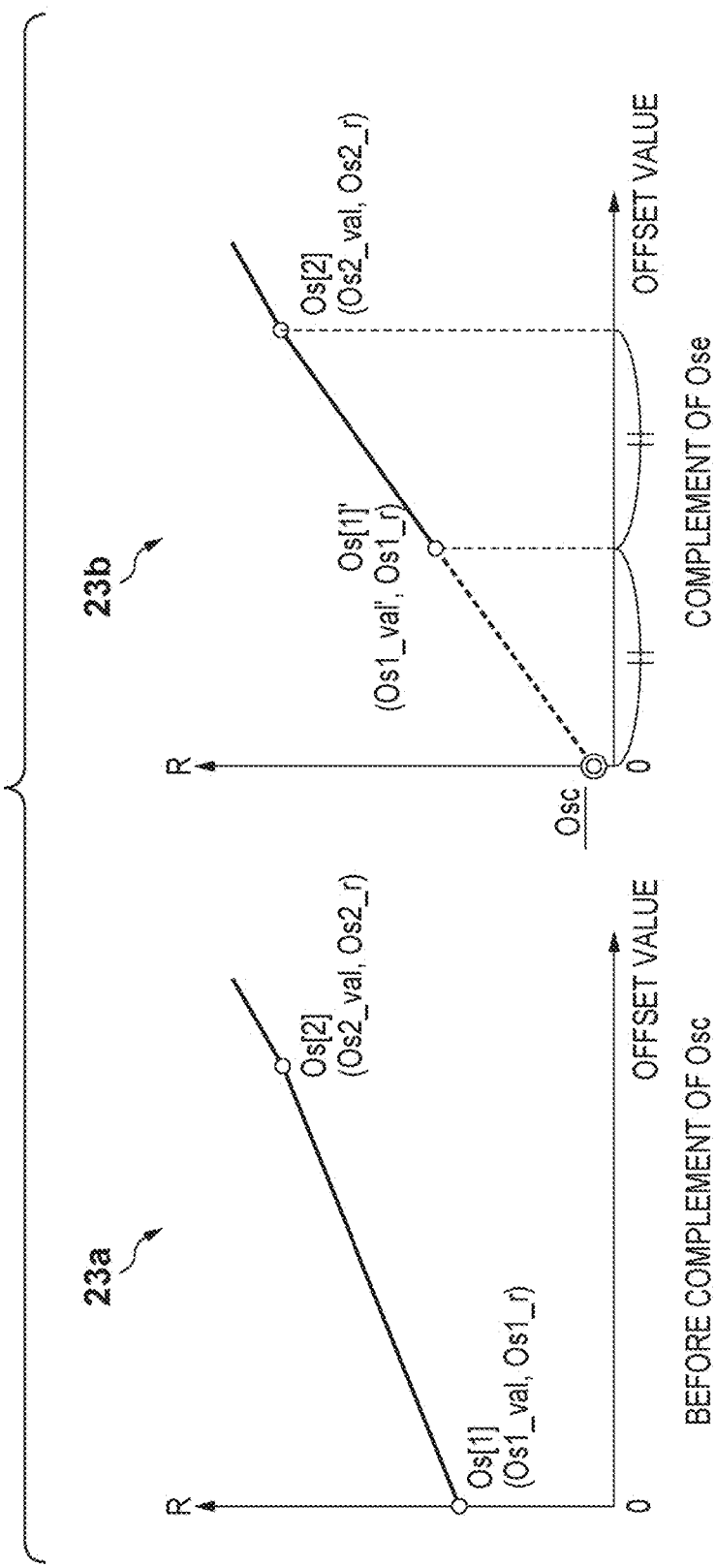
FIG. 23 is a conceptual view showing complement of an offset at the center point of a radial gradation according to the second embodiment.

In step S2704, the CPU 7 corrects the first offset Os[1] in the radial gradation. Before correction, the first offset point Of1 in the radial gradation is set to the center point of the radial gradation, that is, Os[1]_val=0. For example, when the relationship between the R value and the offset is zoomed in near Os[1], the relationship shown in 23a of FIG. 23 is obtained. Complementing the offset at the center point of the radial gradation requires Os[1]_val' obtained by correcting Os[1] val. In this processing, Os[1]_val' is set based on an adjacent offset Os[2]_val according to equation (6):

$$Os[1]\_val' = Os[2]\_val/2 \quad (6)$$

After the end of this processing, the process shifts to step S2705.

In step S2705, the CPU 7 complements an offset Osc at the center point of the radial gradation. Since the offset value at the center point of the radial gradation is always 0, the CPU 7 sets 0 in Osc_val. Then, the CPU 7 estimates color values in Osc from changes of the color values in an offset near the center point. The R, G, and B values Osc_r, Osc_g, and Osc_b in Osc can be calculated using equations (7):

$$Osc\_r = Os[1]\_r - \frac{Os[2]\_r - Os[1]\_r}{Os[2]\_val - Os[1]\_val'} Os[1]\_val'$$

$$Osc\_g = Os[1]\_g - \frac{Os[2]\_g - Os[1]\_g}{Os[2]\_val - Os[1]\_val'} Os[1]\_val' \quad (7)$$

$$Osc\_b = Os[1]\_b - \frac{Os[2]\_b - Os[1]\_b}{Os[2]\_val - Os[1]\_val'} Os[1]\_val'$$

By the above processing, the offset at the center point of the radial gradation such as Osc exemplified in 23b of FIG. 23 can be estimated. After the end of this processing, the process shifts to step S2706.

In step S2706, the CPU 7 complements an offset at the end point of the radial gradation. This processing is the same as that in step S2703, so a description thereof will not be repeated. After the end of this processing, the process shifts to step S2707.

In step S2707, the CPU 7 determines whether Gt is the final gradation cluster information. If Gt is the final gradation cluster information (YES in step S2707), the process ends without any further processing; if it is not the final gradation cluster information (NO in step S2707), shifts to step S2708. In step S2708, the CPU 7 updates Gt to the next gradation cluster information, and the process shifts to step S2701. The processes in steps S2701 to S2707 implement step S2700 in FIG. 24.

In steps S2800 and S2900, the same processes as those in the first embodiment are performed.

By the above processing, a gradation similar to an original image can be vectorized.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104743, filed May 9, 2011, which is hereby incorporated by reference herein in its entirety.

What is claimed is:

1. An image processing apparatus comprising:
a classifying unit constructed to classify pixels whose values are the same or similar in an input image into a same group, and classify pixels whose values are neither same nor similar in the input image into different groups;
a color gradient information calculation unit constructed to calculate color gradient information at pixels of a boundary between groups classified as different groups, wherein the color gradient information calculation unit does not calculate color gradient information at pixels except the boundary;
an attribute determination unit constructed to determine a gradation attribute representing a characteristic of a color gradient at the boundary using the calculated color gradient information;
a gradation cluster information generation unit constructed to generate a gradation cluster by determining color regions belonging to the same gradation among the plurality of color regions using the gradation attribute of the boundary, and to generate gradation cluster information including information about a color region belonging to the generated gradation cluster and a gradation type of the gradation cluster;
a gradation parameter generation unit constructed to generate a gradation parameter for each gradation region using the color region, the color gradient information, and the gradation cluster information;
a color region integration unit constructed to integrate color regions belonging to the same gradation using the gradation cluster information; and
a contour vector description generation unit constructed to generate a contour vector description based on a color region after integration by said color region integration unit, and to generate vector data of the gradation region based on the contour vector description and the gradation parameter.

2. The apparatus according to claim 1, wherein the gradation attribute of the boundary includes one of
a linear gradation attribute in which the color gradient at the boundary is constant in one direction or two directions not opposite to each other, and
a radial gradation attribute in which the color gradient at the boundary is constant in all directions.

3. The apparatus according to claim 2, wherein when an intensity of the color gradient at the boundary is higher than a predetermined threshold, said attribute determination unit determines that the boundary is an edge.

4. The apparatus according to claim 1, wherein the gradation parameter includes at least position information and color information of a point for representing a gradation.

5. The apparatus according to claim 4, wherein said gradation parameter generation unit calculates an average color of the color regions belonging to the same gradation from the input image, and uses the average color of the color regions when generating the color information.

6. The apparatus according to claim 5, further comprising a gradation parameter complement unit constructed to perform color information complement at an end portion or center point of the gradation region for a parameter generated by said gradation parameter generation unit.

7. The apparatus according to claim 1, further comprising:
a unit constructed to execute subtractive color processing for the input image by changing similar pixel values in the input image to same pixel values,
wherein the classifying unit is constructed to classify, into a same group, pixels whose values are same or similar in the input image which is applied the subtractive color processing.

8. An image processing method comprising:
a classifying step of classifying pixels whose values are the same or similar in an input image into a same group, and classifying pixels whose values are neither same nor similar in the input image into different groups;
a color gradient information calculation step of calculating color gradient information at pixels of a boundary between groups classified as different groups, wherein color gradient information is not calculated at pixels except the boundary;
an attribute determination step of determining a gradation attribute representing a characteristic of a color gradient at the boundary using the calculated color gradient information;
a gradation cluster information generation step of generating a gradation cluster by determining color regions belonging to the same gradation among the plurality of color regions using the gradation attribute of the boundary, and generating gradation cluster information including information about a color region belonging to the generated gradation cluster and a gradation type of the gradation cluster;
a gradation parameter generation step of generating a gradation parameter for each gradation region using the color region, the color gradient information, and the gradation cluster information;
a color region integration step of integrating color regions belonging to the same gradation using the gradation cluster information; and
a contour vector description generation step of generating a contour vector description based on a color region after integration in the color region integration step, and generating vector data of the gradation region based on the contour vector description and the gradation parameter.

9. A non-transitory computer-readable medium storing a program for causing a computer apparatus to function as each unit of an image processing apparatus defined in claim 1.

* * * * *